United States Patent
Watanabe et al.

[11] Patent Number: 6,151,285
[45] Date of Patent: Nov. 21, 2000

[54] DISC DEVICE HAVING A CHASSIS AND MOVABLE TRAY PART INCLUDING A TURNTABLE AND PICKUP MEANS WITH A DISC OVERHANGING THE TRAY PERPENDICULAR TO THE DISC INSERTION DIRECTION

[75] Inventors: Takashi Watanabe, Ichikawa; Kazuhiko Suzuki, Tokorozawa; Nobuhiko Fujimura, Hachioji, all of Japan

[73] Assignee: Teac Corporation, Tokyo, Japan

[21] Appl. No.: 09/158,638

[22] Filed: Sep. 22, 1998

Related U.S. Application Data

[62] Division of application No. 08/972,223, Nov. 17, 1997, Pat. No. 5,878,012, which is a division of application No. 08/831,857, Apr. 2, 1997, Pat. No. 5,862,116, which is a continuation of application No. 08/392,365, Feb. 22, 1995, abandoned.

[30] Foreign Application Priority Data

| Feb. 23, 1994 | [JP] | Japan | 6-25666 |
| Feb. 23, 1994 | [JP] | Japan | 6-25667 |
| Mar. 16, 1994 | [JP] | Japan | 6-45578 |
| Mar. 16, 1994 | [JP] | Japan | 6-45579 |

[51] Int. Cl.⁷ .................................................. G11B 33/02
[52] U.S. Cl. .............................................................. 369/77.1
[58] Field of Search .......................... 369/36, 75.1, 75.2, 369/77.1, 178, 192; 360/99.02, 99.06

[56] References Cited

U.S. PATENT DOCUMENTS

| 2,608,456 | 8/1952 | Barth | 369/75.1 |
| 4,464,743 | 8/1984 | Takizawa et al. | 369/75.2 |
| 4,661,940 | 4/1987 | Camerik | 369/111 |
| 4,890,276 | 12/1989 | Ono et al. | 369/77.2 |
| 5,061,121 | 10/1991 | Matiere | 405/155 |
| 5,216,558 | 6/1993 | Griffith et al. | 360/99.06 |
| 5,235,591 | 8/1993 | Nakamura et al. | 369/199 |
| 5,515,357 | 5/1996 | Arata et al. | 369/191 |
| 5,881,045 | 3/1999 | Inoue | 369/192 |

FOREIGN PATENT DOCUMENTS

| 29-1938 | 4/1954 | Japan . |
| 61-122935 | 6/1986 | Japan . |
| 61-292260 | 12/1986 | Japan . |
| 1-122060 | 5/1989 | Japan . |
| 2-98862 | 4/1990 | Japan . |
| 03-185691 | 8/1991 | Japan . |
| 4-54906 | 2/1992 | Japan . |
| 4-102276 | 4/1992 | Japan . |
| 4-110875 | 9/1992 | Japan . |
| 5-120778 | 5/1993 | Japan . |
| 5-151675 | 6/1993 | Japan . |
| 5-61855 | 8/1993 | Japan . |
| 5-242577 | 9/1993 | Japan . |
| 5-342730 | 12/1993 | Japan . |
| 5-342732 | 12/1993 | Japan . |

*Primary Examiner*—George J. Letscher
*Attorney, Agent, or Firm*—Michael N. Meller; Eugene Lieberstein

[57] ABSTRACT

A disc device has a movable mechanism used for moving a carriage carrying a disc so that the carriage either projects from an apparatus or is inserted into the apparatus. The disc carried by the carriage is exposed for an operator to handle the disc when the carriage projects from the apparatus. The disc carried by the carriage is contained in the apparatus after the carriage has been inserted into the apparatus. A rotating unit rotates the disc carried by the carriage and an accessing unit accesses the disc carried by the carriage. The disc device is incorporated into the apparatus. A locking mechanism locks the carriage in the apparatus, and a releasing unit causes the locking mechanism to release locking of the carriage in the apparatus. The releasing unit causes the rotating unit to stop rotating of the disc and also causes the accessing unit to stop accessing the disc, prior to each time the releasing unit causes the locking mechanism to release locking of the carriage in the apparatus. The locking mechanism is contained in the carriage.

14 Claims, 32 Drawing Sheets

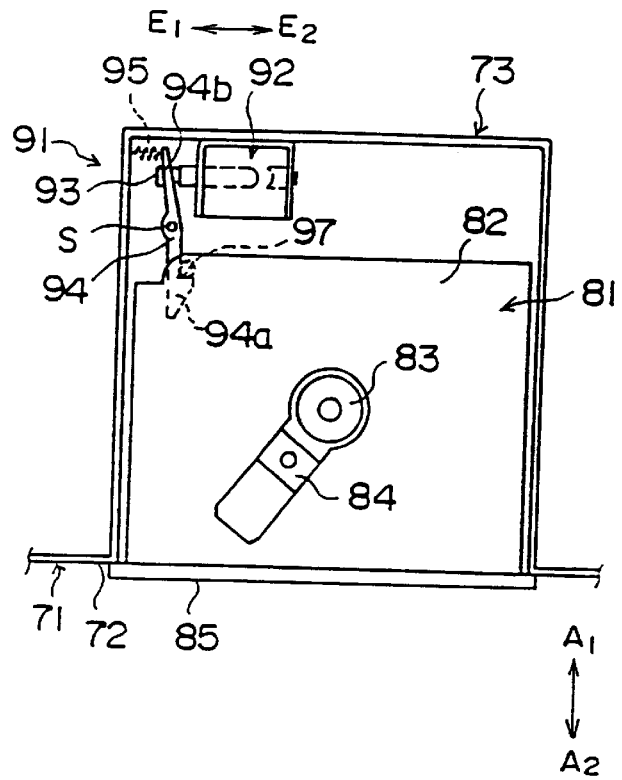
FIG. I (PRIOR ART)
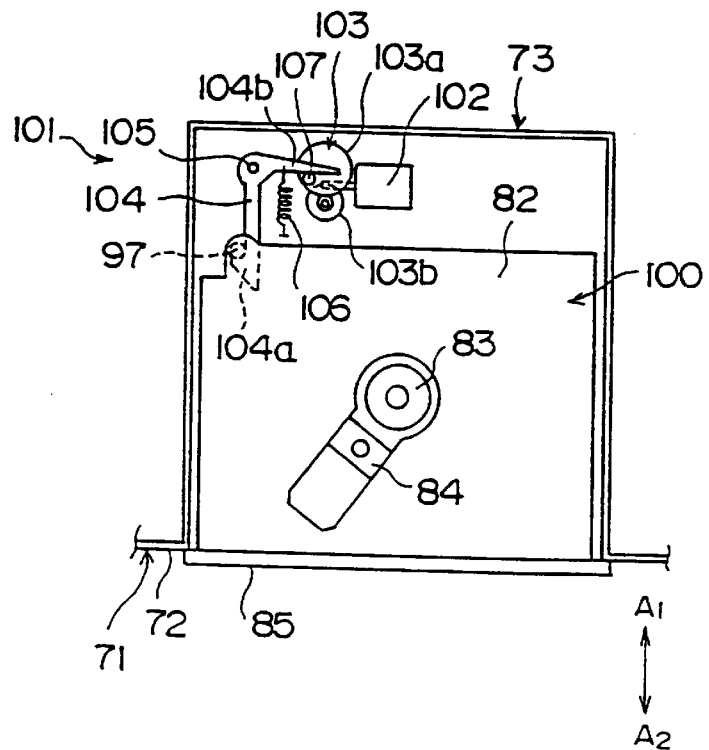
FIG. 2 (PRIOR ART)

FIG. 21
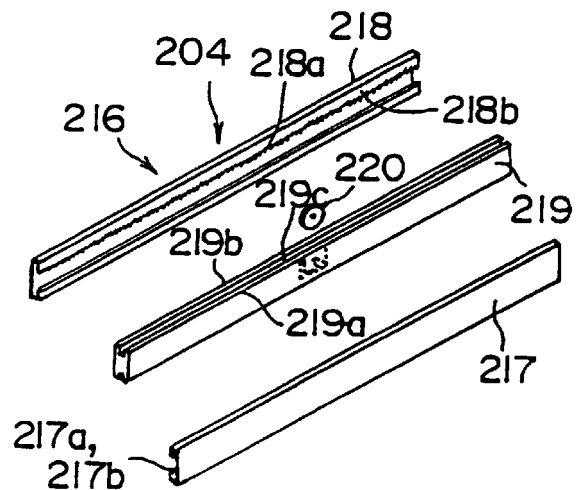
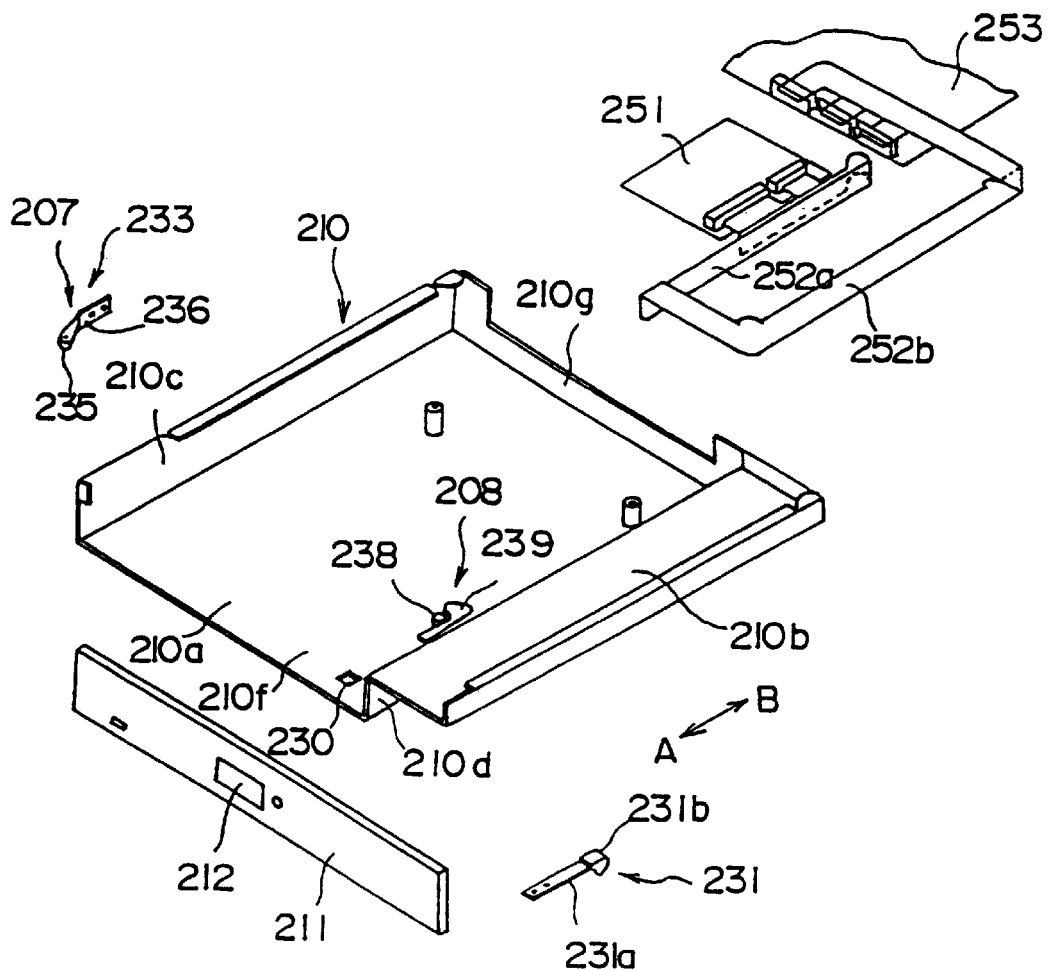

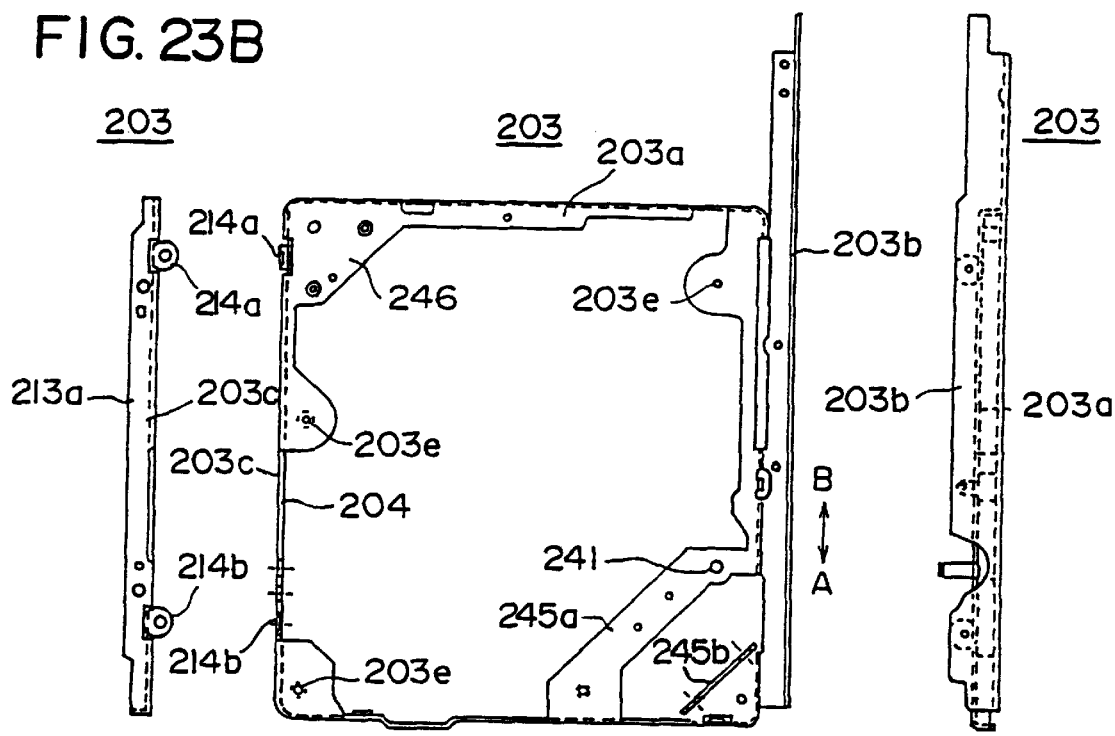
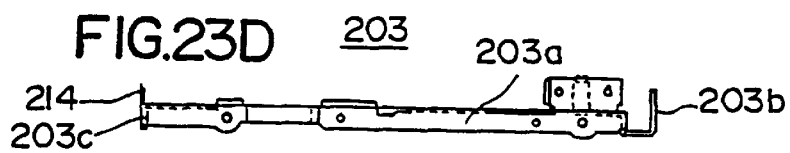

F I G. 39A
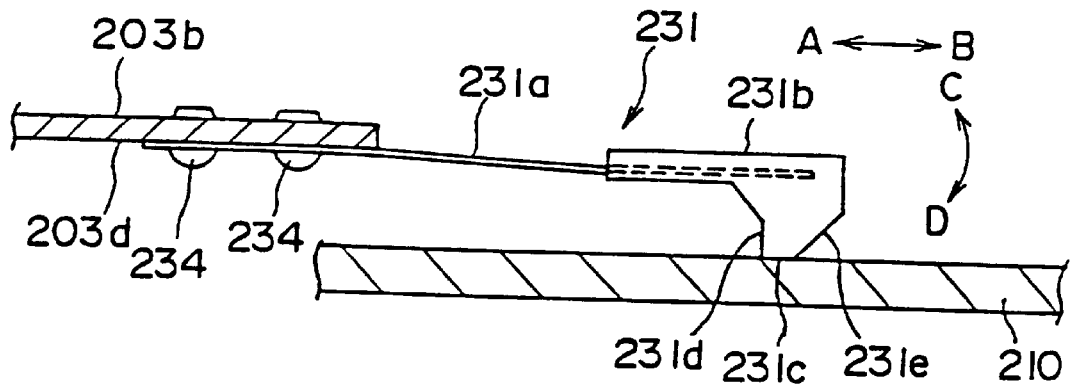
F I G. 39B
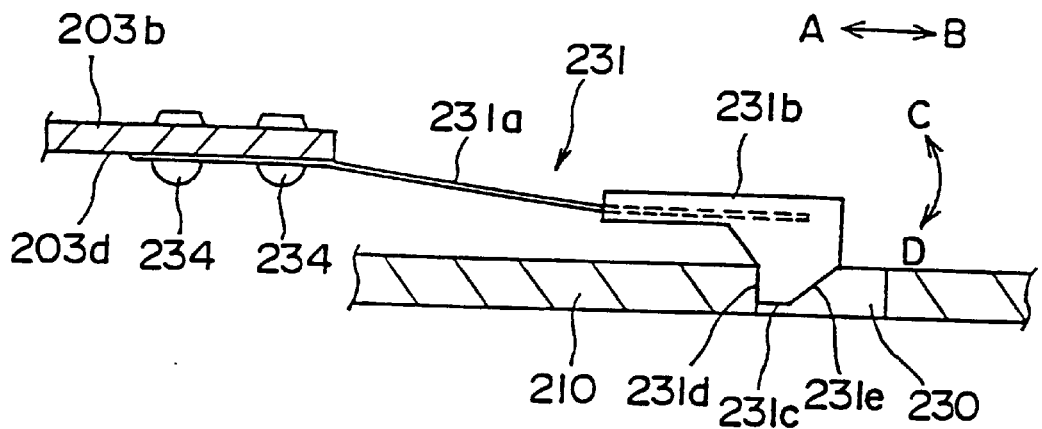

DISC DEVICE HAVING A CHASSIS AND MOVABLE TRAY PART INCLUDING A TURNTABLE AND PICKUP MEANS WITH A DISC OVERHANGING THE TRAY PERPENDICULAR TO THE DISC INSERTION DIRECTION

This application is a division of patent application Ser. No. 08/972,223 filed Nov. 17, 1997, now U.S. Pat. No. 5,878,012 which is a division of U.S. patent application Ser. No. 08/831,857 filed Apr. 2, 1997, now U.S. Pat. No. 5,862,116, which in turn is a continuation of U.S. application Ser. No. 08/392,365 filed Feb. 22, 1995, now abandoned.

BACKGROUND OF THE INVENTION

1. Field of Invention

The present invention relates to a disc device, in particular, to a disc device having a part containing a disc, which part can be drawn from/inserted in to the disc device. One example of such a disc device is a CD-ROM drive device which may be incorporated into a notebook type personal computer or the like.

2. Description of Related Art

A compact disc, having a diameter of 12 cm or 8 cm, serving as an information recording medium, has been being used for recording, for example, data base, software program or the like. Such information recorded on a compact disc will be reproduced using a laser type pick up. The above-mentioned CD-ROM drive device is used to handle the compact disc used as a ROM. Such a compact disc is called a CD-ROM. The CD-ROM drive device has been developed to be incorporated into a notebook type personal computer. The notebook type personal computer is a miniaturized personal computer. In the above-mentioned development, the CD-ROM drive device is developed to be incorporated into a given case.

One example of such a CD-ROM drive device in the related art incorporated into a notebook type personal computer or the like will now be described. A CD-ROM drive body of the CD-ROM drive device is contained in a containing portion formed in a personal computer body. When the CD-ROM is loaded on the CD-ROM drive body or a once loaded CD-ROM is removed from the CD-ROM drive body, the CD-ROM drive body itself is drawn from the personal computer body.

A push-on/push-off mechanism is used between the CD-ROM drive device and the above-mentioned containing portion formed in the personal computer body. By using the push-on/push-off mechanism, the CD-ROM drive body can be locked in the containing portion when an operator pushes the CD-ROM drive body. Further, the locking of the CD-ROM drive body in the containing portion can be released so that the CD-ROM drive body can be drawn from the personal computer, when the operator pushes the CD-ROM drive body. If the CD-ROM drive body can be drawn from the containing portion at any time, a problem may occur. That is, if the CD-ROM drive body is drawn from the containing portion, that is, it is drawn from the personal computer, during the CD-ROM being rotated by means of a spindle motor and/or an optical head accessing the CD-ROM, an operator's hand may, by accident, touch the CD-ROM being rotated.

In order to eliminate such a problem, a locking mechanism having an electrically operating interlocking function has been used instead of the above-described push-on/push-off mechanism. If such a locking mechanism is used, an operator performs an ejecting operation. As a result of the ejecting operation being performed, the rotation of the CD-ROM is stopped and also the optical head is removed from the CD-ROM. The above-mentioned locking of the CD-ROM drive body in the containing portion is then released after the rotation of the CD-ROM has been stopped and also the optical head has been removed from the CD-ROM.

With reference to FIG. 1, the CD-ROM drive device 81 in the related art having such a locking mechanism will now be described. The CD-ROM drive device 81, due to the locking mechanism, releases the locking of the CD-ROM drive body in the containing portion after an operation in the CD-ROM drive device has been stopped. The CD-ROM drive device 81 includes the flat rectangular parallelopiped CD-ROM drive body 82. The CD-ROM drive body 82 has a turn table 83, a spindle motor (not shown in the figure) for rotating the turn table 83, the optical head 84, an optical head moving mechanism (not shown in the figure) and so forth provided therein. Further, a locking mechanism 91 for locking the CD-ROM drive body 82 in the containing portion 73 and releasing the locking is provided in the CD-ROM drive device 81.

The CD-ROM drive body 82 is slidable along directions $A_1$ (rear direction) and $A_2$ (front direction) shown in FIG. 1 with respect to the containing portion 73 formed in the personal computer body 71. FIG. 1 shows a state where the CD-ROM drive body 82 is contained in the containing portion 73. A front panel 85 is provided in front of the CD-ROM drive body 82 as shown in the figure. In this state, the front end of the front panel 85 is approximately aligned with a front surface of the personal computer body 71 along a direction perpendicular to the directions $A_1$ and $A_2$.

The locking mechanism 91 is consists of a plunger 92, a locking arm 94 and a spring 95, they being located at a rear portion of the containing portion 73, and a locking pin 97 formed on the CD-ROM 30 drive body 82. When no electric current is supplied to the plunger 92, the locking arm 94 is forced to turn about a shaft S counterclockwise in the figure by means of the spring 95. An iron core 93 provided as a part of the plunger 92 is movable along directions $E_1$ and $E_2$ shown in the figure. When an electric current is supplied to the plunger 92, the iron core 93 is forced to move in the direction $E_2$ as a result of an electric magnet provided in the plunger 92 attracting the iron core 93.

In a state where the CD-ROM drive body 82 is contained in the containing portion 73, no electric current is supplied to the plunger 92. Therefore, an end portion 94a of the locking arm 94 engages with the locking pin 97 as shown in FIG. 1. Thus, the CD-ROM drive body 82 is locked in the containing portion 73 and thus the CD-ROM drive body 82 cannot be drawn in the direction $A_2$.

When the ejecting operation is performed by the operator, an electric current is supplied to the plunger 92 and thus the electric magnet of the plunger 92 attracts the iron core 93 in the direction $E_2$, the iron core 93 thus moving in the direction. As a result, a projecting end of the iron core 93 pushes a end portion 94b of the locking arm 94 and thus the locking arm 94 is rotated clockwise. Thereby, the end portion 94a is removed from the locking pin 97 and thus the locking of the CD-ROM drive body 82 in the containing portion 73 is released. A pushing mechanism (not shown in the figure) then pushes the CD-ROM drive body 82 in the direction $A_2$ for a predetermined stroke. Thus, the operator may pull the front panel 85 of the CD-ROM drive body 82 and draw the CD-ROM drive body 82 from the containing portion 73 in the direction $A_2$.

In order to make the thus-drawn CD-ROM drive body 82 again be contained in the containing portion 73, an operator may push the CD-ROM drive body 82 in the direction $A_1$. Thus, the end portion 94a of the locking arm 94 engages with the locking pin 97 and thus the CD-ROM drive body 82 is again locked in the containing portion 73.

A CD-ROM drive device 100 in another example in the related art being provided with a locking mechanism 101 including a motor 102 and a group of cams 103 will now be described, with reference to FIG. 2. The same reference numerals, as those of the components in the CD-ROM drive device 81 shown in FIG.1, are given to components in the CD-ROM drive device 100 identical to the components in the device 81.

The locking mechanism 101 includes the motor 102, the group of cams 103, a locking arm 104 and a spring 106. The locking pin 97 is formed on the CD-ROM drive body 82. When no electric current is supplied to the motor 102, the locking arm 104 is formed to be rotated about a shaft 105 clockwise by means of the spring 106.

In a state where the CD-ROM drive body 82 is contained in the containing portion 73, no electric current is supplied to the motor 102. Therefore, an end portion 104a of the locking arm 104 engages with the locking pin 97 as shown in FIG. 2. Thus, the CD-ROM drive body 82 is locked in the containing portion 73 and thus the CD-ROM drive body 82 cannot be drawn in the direction $A_2$.

When the ejecting operation is performed by the operator, an electric current is supplied to the motor 102 and thus the motor 102 rotates cam gears 103b and 103a. As a result, a cam pin 107 presses an end portion 104b of the locking arm 104. Thus, the locking arm 104 is rotated counterclockwise. Thereby, the end portion 104a is removed from the locking pin 97 and thus the locking of the CD-ROM drive body 82 in the containing portion 73 is released. A pushing mechanism (not shown in the figure) then pushes the CD-ROM drive body 82 in the direction $A_2$ for a predetermined stroke. Thus, the operator may pull the front panel 85 of the CD-ROM drive body 82 and draw the CD-ROM drive body 82 from the containing portion 73 in the direction $A_2$.

However, either of the CD-ROM drive devices in the related art shown in FIGS. 1 and 2 needs a space for containing the locking mechanism 91 or 101 behind the CD-ROM drive body 82. Thereby, miniaturizing of the CD-ROM drive device including the containing portion 73 and thinning of the CD-ROM drive device is limited. From another point of view, if the entire volume of the CD-ROM drive device is fixed, such a space for containing the locking mechanism 91 or 101 restricts a space required for containing other attachments of the CD-ROM drive device such as an electric circuit substrate, a flexible wire and so forth.

With reference to FIGS. 3, 4 and 5, a CD-ROM drive device 161 in another example in the related art will now be described. FIG.4 shows a front elevational view of the device 161 but a front panel 172 is omitted in FIG. 4. FIG. 5 shows a left side elevational view of the device 161. The CD-ROM drive device 161 includes a containing portion 162 fixed in a personal computer body and a CD-ROM drive body 171 movable with respect to the containing portion 162 along directions $A_1$ and $A_2$ shown in FIGS. 3 and 5.

The CD-ROM drive body 171 includes a flat rectangular parallelopiped housing 173. The housing 173 has the turn table 185, the spindle motor (not shown in the figure) for rotating the turn table 185, the optical head 186, the optical head moving mechanism (not shown in the figure) and so forth provided therein. The housing 173 further has the front panel 172 fixed thereon. Further, the locking mechanism for locking the CD-ROM drive body 171 in the containing portion 162 and releasing the locking is provided in the CD-ROM drive device 161. The locking mechanism used in the device 161 comprises, for example, the above-described push-on/push-off mechanism.

A top plate 173a of the housing 173 has an opening 173d formed therein. The turn table 185 projects from a top surface 173a through the opening 173d as shown in FIG. 3, the CD-ROM 51 being placed on the turn table 185. The optical head 186 is exposed via the opening 173d as shown in FIG. 3, the optical head 186 directing upward.

Side plates 164 and 165 have rail members 181 and 182 fixed thereon respectively. Each of the rail members 181 and 182 extends along the directions $A_1$ and $A_2$ and has an angular letter "C"-shaped section as shown in FIG. 4. Side plates 173b and 173c of the housing 173 of the CD-ROM drive body 171 have guides 175 and 176 formed thereon respectively. Each of the guides 175 and 176 is shaped so that a sectional view thereof includes a protrusion which is fitted into a groove formed on a respective one of the rail members 181 and 182 as shown in FIG. 4. The thus-shaped guides 175 and 176 are slidable on the rail members 181 and 182 respectively in a state in which the protrusions of the guides 175 and 176 are fitted into the grooves of the rail members 181 and 182 respectively.

As the guides 175 and 176 being guided by the rail members 181 and 182 respectively, the CD-ROM drive body 171 is movable with respect to the containing portion 162 along the directions $A_1$ and $A_2$. FIG. 3 shows a state in which the CD-ROM drive body 171 has been drawn from the containing portion 162 to the limit.

In a state in which the CD-ROM drive body 172 is contained in the containing portion 162, the locking mechanism locks the CD-ROM drive body 171 in the containing portion 162. Thus, drawing of the CD-ROM drive body 171 in the direction $A_2$ is prevented. In this state, the protrusions of the guides 175 and 176 are fitted into the grooves of the rail members 181 and 182 through the entire length thereof along the directions $A_1$ and $A_2$.

When the ejecting operation is performed by an operator, the locking of the CD-ROM drive body 171 in the containing portion 162 performed by the locking mechanism is released. After that, the operator may draw the CD-ROM drive body 171 from the containing portion 162 in the direction $A_2$ by pulling the front panel 172. As shown in FIGS. 3 and 5, in the state where the CD-ROM drive body 171 has been drawn from the containing portion 162 to the limit, the protrusions of the guides 175 and 176 engage with the grooves of the rail members 181 and 182 for a length of $L_1$ along the directions $A_1$ and $A_2$ shown in the figures at the rear end of the CD-ROM drive body 171.

In the CD-ROM drive device 161 in the related art shown in FIGS. 3, 4 and 5, a length along the directions $A_1$ and $A_2$ for which the protrusions of the guides 175 and 176 engage with the grooves of the rail members 181 and 182 becomes shorter as the CD-ROM drive body 171 is drawn from the containing portion 162. Dimensions of the CD-ROM drive body 171 and those of the containing portion 162 are the minimum ones in order to miniaturize the CD-ROM drive device 161. As a result, the above-mentioned engaging length $L_1$ shown in FIGS. 3 and 5 is inevitably shortened to be approximately 10% of the entire length of each of the guides 175 and 176.

Further, there are appropriate clearances between each of the guides 175 and 176 and a respective one of the rail members 181 and 182 such that the CD-ROM drive body 171 is slidable in the containing portion 162 along the directions $A_1$ and $A_2$. By these clearances, the CD-ROM drive body 171 may undesirably move with respect to the containing portion 162 along directions other than along the directions $A_1$ and $A_2$. Lengths of such possible undesirable movement increase as the length in the directions $A_1$ and $A_2$ for which the guides 175 and 176 engage with the rail members 181 and 182 is shortened.

That is, the lengths of such possible undesirable movement increase as the CD-ROM drive body 171 is drawn from the containing portion 162 to the limit. The possible undesirable movement has the maximum moving lengths when the CD-ROM drive body 171 has been drawn from the containing portion 162 to the limit. The possible undesirable movement includes movement in vertical directions $Z_1$ and $Z_2$ shown in FIGS. 4 and 5 and movement in horizontal directions $B_1$ and $B_2$ shown in FIGS. 3 and 5. In the structure shown in FIGS. 3, 4 and 5, assuming that a drawn length of the CD-ROM drive body 171 is 120 mm when it has been drawn to the limit and then the above-mentioned length $L_1$ is 10 mm, an front end of the CD-ROM drive body 171 may move for approximately 4 mm in the vertical directions.

In a disc device, such as the CD-ROM drive device, in the related art, a tray such as the CD-ROM on which a disc such as the CD-ROM is placed is driven by a motor. When the tray has been drawn from a chassis of the disc device, an operator may place the disc on a turn table provided in the tray. The motor then drives the tray having the disc placed on the turn table to be returned inside the chassis. Then, the disc is clamped onto the turn table.

Such a CD-ROM drive device has the motor and a power transmission mechanism for transmitting driving power of the motor to the tray provided therein. Due to a space for containing the motor and the power transmission mechanism, miniaturizing of the CD-ROM drive device and thinning of the CD-ROM drive device is limited. Therefore, it is not possible to incorporate such a CD-ROM drive device into a notebook type personal computer.

In order to eliminate such a problem, a disc device, such as the CD-ROM drive device, which does not include the motor and the power transmission mechanism has been being developed. In such a disc device, the tray is manually moved so that either the tray is inserted in the chassis for an operator to use the disc as an information recording medium or the tray is drawn from the chassis for the operator to replace the disc on the tray. A position of the tray which is obtained as a result of the tray being inserted into the chassis so that the operator can use the disc as an information recording medium will be referred to as a loaded position, hereinafter. A position of the tray which is obtained as a result of the tray being drawn from the chassis so that the operator can replace the disc on the tray will be referred to as a replaceable position, hereinafter.

A disc device in an example in the related art such as the device mentioned above in which the tray is manually moved will now be described. The tray is supported on a sub-chassis which has guide rails provided on two sides thereof. Due to a function of the guide rails of the sub-chassis, the sub-chassis is movable with respect to the chassis of the disc device. Thus, the tray is movable with respect to the chassis. The turn table and a pick up are mounted to a base which is mounted to the sub-chassis. Because the turn table and the pick up are precision components, it is necessary to prevent any vibrations occurring in the sub-chassis from being applied to the turn table and pick up. For this purpose, a rubber-made vibration absorbing member for absorbing vibrations is inserted between the base and the sub-chassis.

However, in the above-described structure, because the tray is directly mounted on the sub-chassis, vibrations occurring in the sub-chassis are directly transmitted into the tray. Further, part of these vibrations are also transmitted to the turn table and pick up via the vibration absorbing member and the base. Because the vibration absorbing member is provided only between the sub-chassis and the base, the turn table and the pick up vibrate periodically in a period different from a period in which the tray vibrates periodically. If a relatively large vibration occurs in the sub-chassis, the rubber-made vibration absorbing member may be elastically deformed in a large deformation length. In such a case, the turn table and pick up may vibrate violently and thus the disc clamped onto the turn table may come into contact with the tray. If the disc come into contact with the tray, the disc may be damaged.

Similarly, due to the vibration of the turn table, the turn table may come into contact with a top plate. The top plate is a plate which cover a top side of the chassis of the disc device. The top plate is located over the turn table, when the tray is in the above-mentioned loaded position. In order to prevent the turn table from coming into contact with the top plate, it is necessary to position the top plate an appropriate clearance away from the turn table. However, this result in limiting miniaturizing of the disc device and thinning thereof.

In a disc device in the related art, the tray has outer dimensions such that the entire outer diameter of the disc can be placed on the tray. Specifically, the tray has a concavity formed thereon which contains the disc. Such a structure of the tray limits miniaturizing of the tray and thus limits miniaturizing of the disc device.

SUMMARY OF THE INVENTION

An object of the present invention is to provide a disc device in which a space for the locking mechanism, such as the above-mentioned mechanism 91 or 101, is not needed behind a carriage such as the CD-ROM drive body 82. Thus, miniaturizing and thinning of the disc device can be realized.

In order to achieve the above-mentioned object, in a disc device which is incorporated in an apparatus, disc rotation is stopped and also accessing of the disc is stopped prior to a time a carriage for carrying the disc is projected from the apparatus. That is, a locking mechanism is provided for locking the carriage in the apparatus so that the carriage is prevented from projecting before the disc rotation is stopped and also the accessing of the disc is stopped. The locking mechanism is contained in the carriage.

As a result, a problematic situation in which an operator's hand may come into contact with the disc when the disc is being rotated and accessed is avoided. Further, as a result of the locking mechanism being contained in the carriage, it is possible to miniaturize and thin the disc device.

Another object of the present invention is to provide a disc device in which lengths of possible undesirable movement of a carriage such as the above-mentioned possible undesirable movement of the CD-ROM drive body can be reduced. Thus, miniaturizing and thinning of the disc device can be realized.

In order to achieve the above-mentioned object, a guiding mechanism is provided for guiding the carriage to move with respect to the apparatus in a predetermined manner. The guiding mechanism includes:

a static member mounted on the apparatus and having a rack gear;

a moving member mounted on the carriage and having a rack gear;

an intermediate member being fitted to the static member and the moving member, the intermediate member sliding on the static member and also sliding on the moving member as the carriage moves with respect to the apparatus;

the intermediate member having a pinion gear rotatably supported thereon, the pinion gear engaging with the rack gear of the static member at a first position of the pinion gear, and engaging with the rack gear of the moving member at a second position of the pinion gear opposite to the first position thereof, so that the pinion gear rotates as the intermediate member slides on the static member and also slides on the moving member.

By providing such a guiding mechanism, it is possible for, even in a state where the carriage has been projected from the apparatus to the limit, by approximately half the length of the entire length of each of the static member and moving member, the intermediate member is fitted to a respective one of the static member and moving member. As a result, disadvantageous possible movement a projecting end of the carriage with respect to the apparatus in a state where the carriage has been projected from the apparatus can be reduced.

Another object of the present invention is to provide a disc device in which undesirable vibration of the turn table is reduced. Thus, miniaturizing and thinning of the disc device can be realized.

For this purpose, in one aspect of the present invention, a disc device comprising:

a turn table for rotating a disc;

a pick up unit for detecting information recorded in said disc;

a base for supporting said turn table and said pick up unit;

a tray, mounted on said base, for guiding an operator's placement of said disc on said turn table, wherein said operator may move said tray between a disc loading position and a disc replacement position;

a sub-chassis for supporting said base, said sub-chassis being slidably supported on a chassis so that said tray may move between said disc loading position and said disc replacement position; and a vibration absorbing member provided between said sub-chassis and said base, for elastically supporting said base and said tray.

In this structure, the vibration absorbing member elastically supports not only the base supporting the turn table and pick up unit but also the tray. Therefore, the disc clamped onto the turn table is prevented from disadvantageously coming into contact with the tray.

Another object of the present invention is to provide a disc device in which the tray can be miniaturized and thus the disc device can be miniaturized.

For this purpose, in another aspect of the present invention, a disc device comprising:

a turn table for rotating a disc; and a tray for guiding an operator's placement of said disc on said turn table, said operator being able to move said tray between a disc loading position and a disc replacement position; and said tray having a structure such that a part of said disc placed on said turn table extends from an edge of said tray.

Thus, an operator can easily hold the extending part of the disc and thus easily and surely take the disc out from the tray. Further, such a structure of the tray enables the chassis to be miniaturized and thus the disc device to be miniaturized.

Other objects and further features of the present invention will become more apparent from the following detailed description when read in conjunction with the accompanying drawings.

BRIEF DESCRIPTION OF THE DRAWINGS

FIG. 1 shows a plan view of a CD-ROM drive device in an example in the related art;

FIG. 2 shows a plan view of a CD-ROM drive device in another example in the related art;

FIG. 21 shows an exploded perspective view of lower part of the CD-ROM drive device shown in FIG. 18;

FIGS. 23A, 23B, 23C, and 23D show a sub-chassis of the CD-ROM drive device shown in FIG. 18;

FIGS. 39A and 39B are magnified sectional side elevational views of a first holding member;

DESCRIPTION OF PREFERRED EMBODIMENTS

Figure 6:
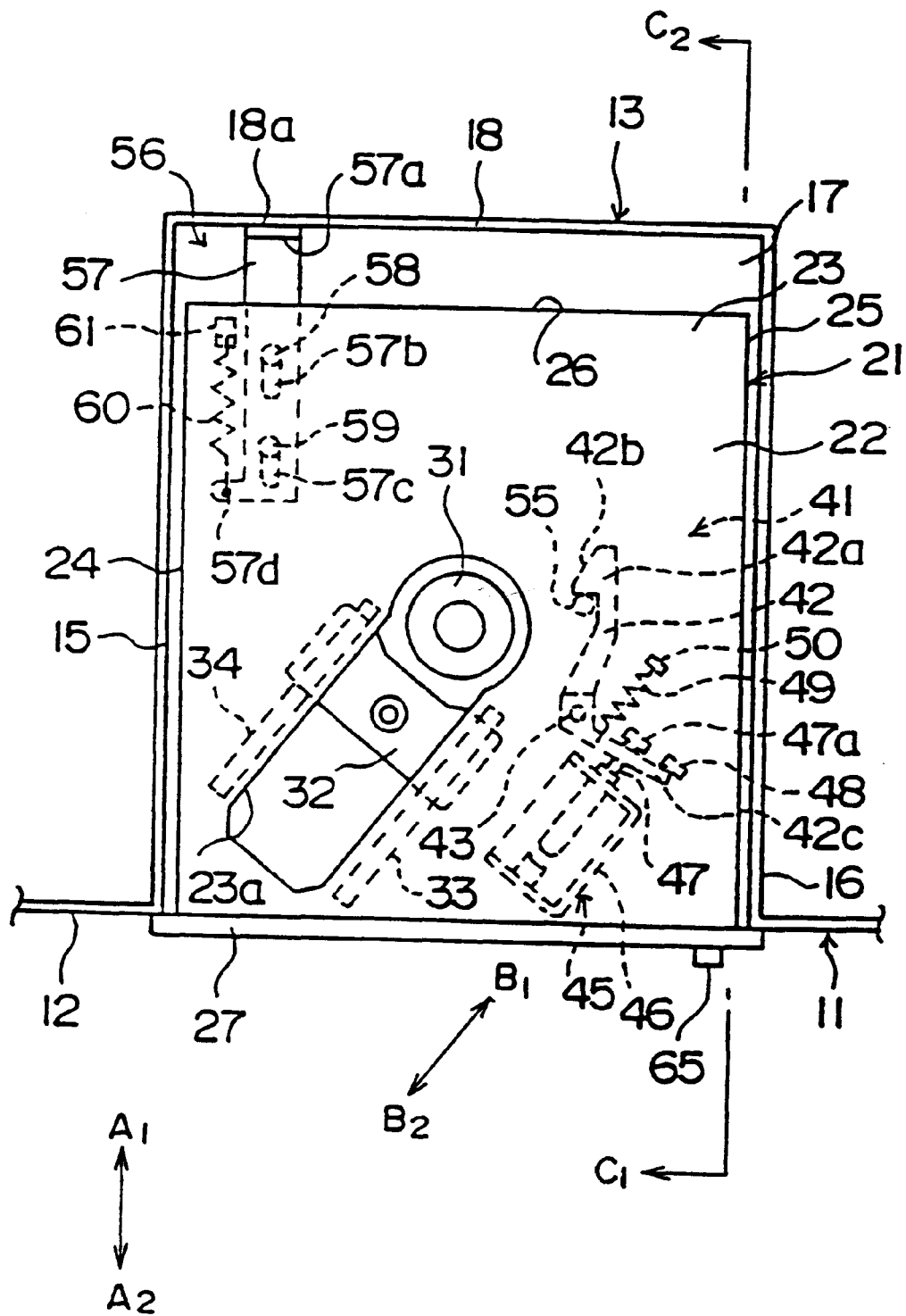
FIG. 6 shows a plan view of a CD-ROM drive device in a first embodiment of the present invention in a state in which a CD-ROM drive body is contained in a containing portion.
Figure 7:
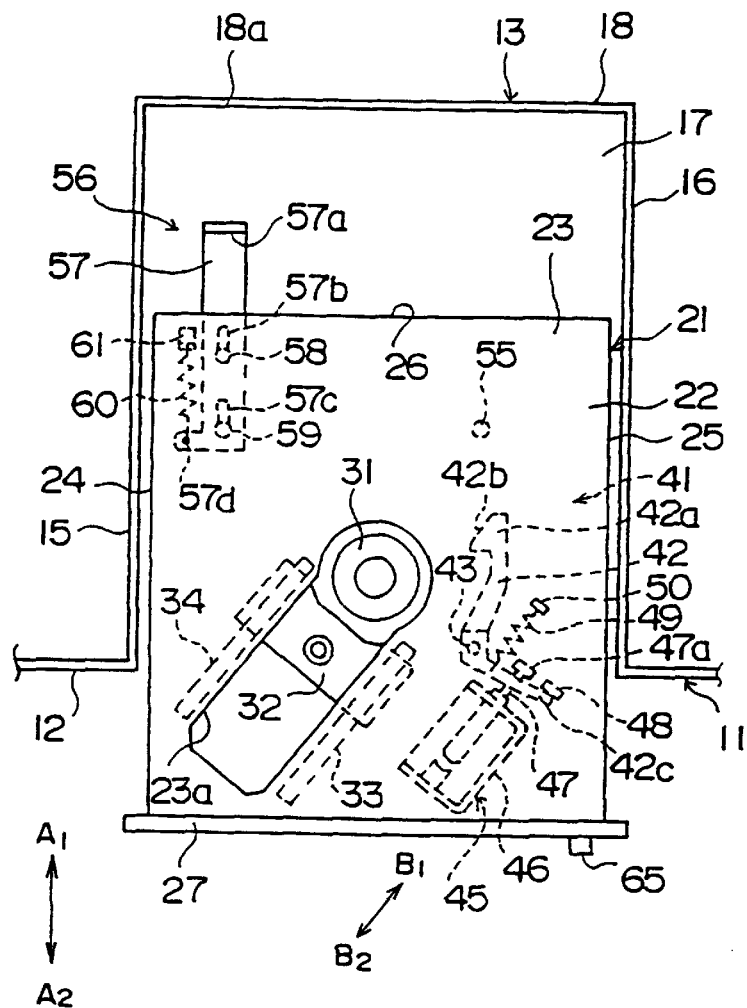
FIG. 7 shows a plan view of the CD-ROM drive device shown in FIG. 6 in a state in which the CD-ROM drive body is partially contained in the containing portion.

With reference to FIGS. 6, 7, 8, 9 and 10, a CD-ROM drive device 21 in a first embodiment of the present invention will now be described. FIG. 6 shows a state in which a CD-ROM drive body 22 is contained in and has been locked in a containing portion 13. FIG. 7 shows a state in which the body 22 has been intermediately inserted into the containing portion 13 and has not been locked in the containing portion 13.

Figure 8:
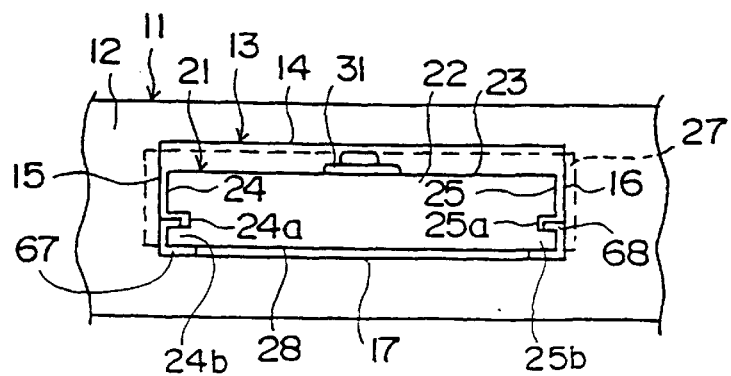
FIG. 8 shows a front elevational view of the CD-ROM drive device shown in FIG. 6, and in particular shows a sliding mechanism.

In FIG. 8, indicating of a front panel is omitted and thus a sliding mechanism for making the CD-ROM drive body 22 be slidable with respect to the containing portion 13 is indicated.

The CD-ROM drive device 21 includes the CD-ROM drive body 22 having a flat rectangular parallelopiped shape. The CD-ROM drive body 22 is provided with a turn table 31, a spindle motor 35 for rotating the turn table 31, an optical head 32, guide shafts 33 and 34 for guiding movement of the optical head 32, an optical head moving mechanism (not shown in the figures), and so forth. The CD-ROM drive body 22 is slidable along directions $A_1$ and $A_2$, shown in FIGS. 6, 7 and 10, with respect to the containing portion 13 formed in a personal computer body 11. An opening 23a is formed in a top plate 23 of the CD-ROM drive device 22. Through the opening 23a, the turn table 31 projects upward and also the optical head 32 is exposed.

A lock mechanism 41 is provided inside the CD-ROM drive body 22. The locking mechanism 41 locks the CD-ROM drive body 22 in the containing portion 13 and releases the locking. A pushing mechanism 56 is provided at a rear end of the CD-ROM drive body 22. The pushing mechanism 56 pushes the CD-ROM drive body 22 so as to move it forward in the direction $A_2$ with respect to the containing portion 13.

Figure 10:
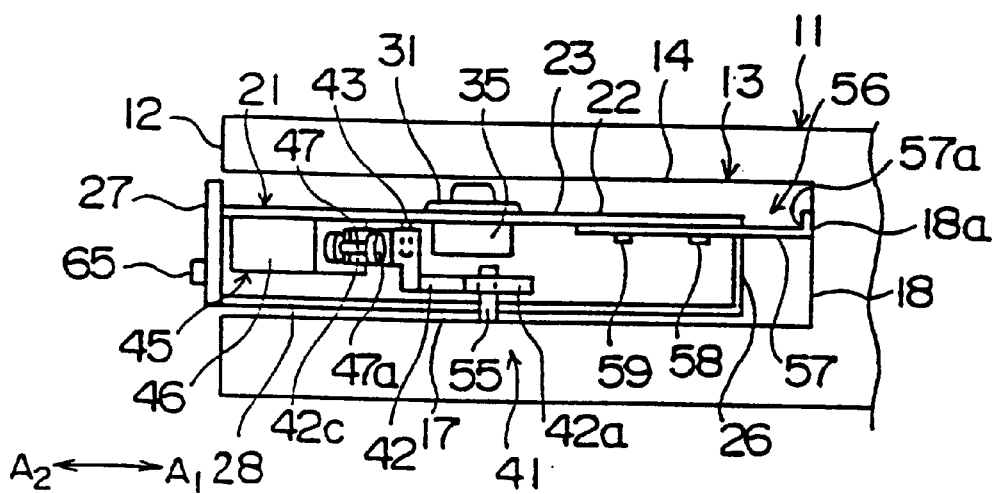
FIG. 10 shows a side elevational sectional view of the CD-ROM drive device shown in FIG. 6 viewed along a line $C_1$–$C_2$ shown in FIG. 6.

In FIGS. 6 and 10, the CD-ROM drive body 22 is in a state in which the CD-ROM drive body 22 is contained in the containing portion 13. In this state, the front panel 27 provided in front of the CD-ROM drive device 22 is located so that a front surface of the front panel 27 is approximately aligned with a front surface 12 of the personal computer body 11 along a direction perpendicular to the directions $A_1$ and $A_2$.

As shown in FIG. 8, the sliding mechanism of the CD-ROM drive device 22 includes guiding protrusions 24b and 25b protrude from side plates 24 and 24 respectively of the CD-ROM drive body 22. Each of the guiding protrusions 24b and 25b is formed as a result of forming grooves 24a and 25a and extends along the directions $A_1$ and $A_2$. The sliding mechanism also includes rails 67 and 68 mounted on side walls 15 and 16 respectively of the containing portion 13. Each of the rails 67 and 68 has a sectional view of an angular letter "C" as shown in FIG. 8 and extends along the directions $A_1$ and $A_2$. Each of the guiding protrusions 24b and 25b loosely is fitted to a concavity of a respective one of the rails 67 and 68 so that the CD-ROM drive body 22 is slidable with respect to the containing portion 13 in the directions $A_1$ and $A_2$ as the guiding protrusions 24b and 25b are guided by the rails 67 and 68.

The locking mechanism 41 is provided at a front space inside the CD-ROM drive body 22. The locking mechanism 41 includes a locking arm 42 supported by the shaft 43 formed in the CD-ROM drive body 22, the arm 42 being thus rotatable about the shaft 43. The mechanism 41 further includes a spring 49 which is provided between the locking arm 42 and a spring holding portion 50 formed in the CD-ROM drive body 22. The mechanism 41 further includes a plunger 45 for rotating the locking arm 52.

When no electric current is supplied to the plunger 45, the locking arm 42 is forced to turn about the shaft 43 counterclockwise in FIGS. 6 and 7 by means of the spring 49. Therefore, a end portion 42c of the locking arm 42 comes into contact with a stopper 48 which is formed in the CD-ROM drive body 22. An iron core 47 provided as a part of the plunger 45 is movable along directions $B_1$ and $B_2$ shown in the figures with respect to a plunger body 46 of the plunger 45. When an electric current is supplied to the plunger 92, the iron core 93 is forced to move in the direction $B_2$ as a result of an electric magnet provided in the plunger 92 attracting the iron core 93.

A locking pin 55 is formed on a bottom 17 of the containing portion 13, the pin 55 being used so that locking arm 42 of the locking mechanism 41 engages the pin 55 and thus the CD-ROM drive body 22 is locked in the containing portion 13 as shown in FIG. 6. An appropriate opening is formed in a bottom plate 28 of the CD-ROM drive body 22 such that the locking pin 55 is prevented from coming into contact with the bottom plate 28 while the CD-ROM drive body 22 moves in the containing portion 13. The locking pin 55 projects inside the CD-ROM drive body 22 through the opening when a certain length of the CD-ROM drive body 22 is contained in the containing portion 13. As shown in FIG. 6, in a state in which the CD-ROM drive body 22 is contained in the containing portion 13, an engaging portion 42a of the locking arm 42 engages with the locking pin 55 and thus the CD-ROM drive body 22 is locked in the containing portion 13.

Thus, the locking mechanism 41 has a simple structure consisting of the locking arm 42, plunger 45 and spring 49.

As shown in FIGS. 6 and 7, the pushing mechanism 56 includes a sliding lever 57, and a spring 60 which is provided between a spring holding portion 61 provided in the CD-ROM drive body 22 and an end portion 57d of the sliding lever 57. Pins 58 and 59 fixed on a rear surface of the top plate 23 of the CD-ROM drive device 22 are fitted into long holes 57b and 57c respectively. The long holes 57b and 57c are formed in the sliding lever 57. Because the pins 58 and 59 can move inside the long holes 57b and 57c respectively, the sliding lever 57 can move in the directions $A_1$ and $A_2$ with respect to the CD-ROM drive body 22. The sliding lever 57 is forced to move the direction $A_1$ by means of the spring 60. As shown in FIG. 10, the sliding lever 57 projects backward in the direction $A_1$ from a rear plate 26 of the CD-ROM drive body 22. A projecting end portion 57a of the sliding lever 57 comes into contact with a contact portion 18a of a rear wall 18 of the containing portion 13 when the CD-ROM drive body 22 is contained in the containing portion 13.

Performance of the CD-ROM drive device 21 will now be described. The description to be made is description of the performance executed when the CD-ROM drive body 22 is being contained in the containing portion 13 and is moving so as to project forward from the front surface 12 of the personal computer body 11.

In the state in which the CD-ROM drive body 22 is contained in the containing portion 13, no electric current is supplied to the plunge 45 of the locking mechanism 41. Therefore, the engaging portion 42a of the locking arm 42 engages with the locking pin 55, and thus the CD-ROM drive body 22 is locked so as to be prevented from being drawn forward in the direction $A_2$. In this time, the end 57a of the sliding lever 57 has come into contact with the contact portion 18a of the containing portion 13 and thus the sliding lever has moved in the $A_2$ direction, the spring 60 being in its expanded state.

Figure 9:
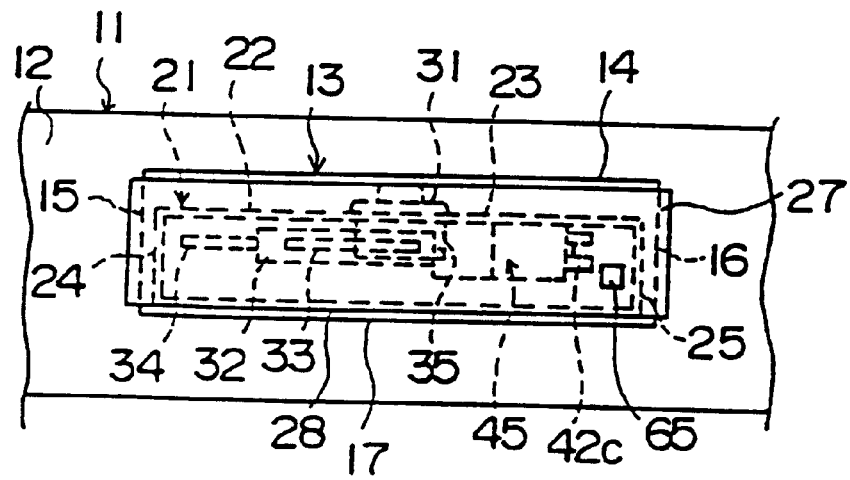
FIG. 9 shows another front elevational view of the CD-ROM drive device shown in FIG. 6.

When an operator presses an ejecting switch 65 provided on the front panel 27 as shown in FIGS. 6, 7 and 9, a control unit (not shown in the figures) of the CD-ROM drive device 21 detects this pressing operation and then causes the spindle motor 35 to stop and the optical head to remove from the CD-ROM placed on the turn table 31.

The control unit then supplies an electric current to the plunger 45 for an appropriate duration. Thus, the plunger 45 causes the iron core 47 to move in the direction $B_2$. Thus, the end portion 47a of the iron core 47 comes into contact with the end portion 42c of the locking arm 42. As a result, the locking arm 42 is rotated clockwise about the shaft 43. Thereby, the engaging portion 42a is disengaged from the locking pin 55 and thus the locking of the CD-ROM drive body 22 in the containing portion 13 is released.

As a result of the releasing the locking, an elastic shrinkage force of the spring 60 of the pushing mechanism 56 causes the CD-ROM drive body 22 to move forward in the direction $A_2$ for a predetermined length. The above-mentioned elastic shrinkage force of the spring 60, is created as a result of the spring 60 having been expanded when the CD-ROM drive body 22 was contained in the containing portion 13. The electric shrinkage force of the spring 60 is a force to shorten a distance between the end portion 57d of the sliding lever 57 and the spring holding portion 61. The above-mentioned movement of the CD-ROM drive body 22 with respect to the containing portion 13 is performed as the guiding protrusions 24b and 25b are guided by the concavities of the rails 67 and 68.

After the above-mentioned appropriate duration has elapsed, supply of the electric current to the plunger 45 is stopped and thus a force causing the iron core 47 to move in the direction $B_2$ is canceled. As a result locking arm 42 is rotated counterclockwise by means of the spring 49 and thus is returned into a previous state as shown in FIG. 7.

Thus, the operator can handle the front panel 27 of the CD-ROM drive body 22 which has moved forward for the predetermined length as mentioned above. The operator thus may draw the CD-ROM drive body 22 forward to the limit and thus either may pick up the CD-ROM placed on the turn table 31 or may place a desired CD-ROM on the turn table 31.

In order to make the CD-ROM drive body 22, which has been drawn forward to the limit, come to be contained in the containing portion 13, the operator may press the CD-ROM drive body 22 in the direction $A_1$ into the containing portion 13. By this pressing operation, the CD-ROM drive body 13 is inserted into the containing portion 13 and thus enters into a state immediately before the state shown in FIG. 6 in which of the CD-ROM drive body 13 is completely contained in the containing portion 13. In the state immediately before the state shown in FIG. 6, an oblique portion 42b located at a extending end of the locking arm 42 comes into contact with the locking pin 55. When the operator further presses the CD-ROM drive body 22 in the direction $A_1$, the oblique portion 42b slides on the locking pin 55 and thus the locking lever 42 is rotated clockwise. Thus, the contact between the locking lever 42 and the locking pin 55 does not prevent the CD-ROM drive body 22 from being further inserted. As a result of the CD-ROM drive body 22 being further inserted, the engaging portion 42a engages with the locking pin 55 as shown in FIG. 6. Thus, the CD-ROM drive body 22 is locked in the containing portion 13 and thus the inserting of the CD-ROM drive body 22 into the containing portion 13 is completed.

If the CD-ROM (not shown in the figures) was placed on the turn table 31 when the CD-ROM drive body 22 was in the state in which the CD-ROM drive body 22 had been drawn in the direction $A_2$ to the limit, the CD-ROM is located in a certain position after the CD-ROM drive body 22 has been completely contained in the containing portion 13. This certain position is a position on the turn table 31 and between the top plate 23 of the CD-ROM drive body 22 and a ceiling 14 of the containing portion 13.

In the CD-ROM drive device 21 in the embodiment of the present invention, as described above, the locking mechanism 41 electrically controlled by the control unit is provided. Thereby, when the CD-ROM drive body 22 will be drawn, that is, will project from the personal computer body 11, the rotation of the turn table 31 is previously automatically stopped and the optical head 32 is previously automatically removed from the CD-ROM placed on the turn table 31. Then, the locking mechanism is automatically operated and thus locking of the CD-ROM drive body 22 in the containing portion 13 by means of the locking pin 55 and locking lever 42 is released. Therefore, the above-mentioned problem can be eliminated, the problem being one that a hand or the like of the operator might come into contact with the CD-ROM during the rotation thereof if the CD-ROM drive body 22 projected during the rotation of the CD-ROM.

Further, the locking mechanism 41 is provided in a space inside the CD-ROM drive body 22. Therefore, no extra space is required outside the CD-ROM drive body 22 in the containing portion 13 particularly for containing the locking mechanism 41. Further, it is preferable that the space for containing the locking mechanism 41 is created as a result of using a free space unexpectedly formed in the body 22 during designing the CD-ROM drive body 22. If such creation of the space is possible, it is not necessary to increase outer dimensions of the CD-ROM drive body 22 particularly for containing the locking mechanism 41. As a result, miniaturization and thinning of the CD-ROM drive device 21 including the containing portion 13 can be achieved. Thereby, miniaturization and thinning of the personal computer body 11 can also be achieved.

Further, because no extra space is required outside the CD-ROM drive body 22 in the containing portion 13 particularly for containing the locking mechanism 41 as mentioned above, arrangement of other accessories of the CD-ROM drive device 21 such as an electric circuit substrate, a flexible electric wire and so forth is easy.

A prime mover in the locking mechanism 41 is not limited to the plunder 45. For example, a combination of a motor and cam gears can also be used as the prime mover in the locking mechanism 41.

With regard to FIGS. 11, 12, 13 and 14, a CD-ROM drive device 111 in a second embodiment of the present invention will now be described.

The CD-ROM drive device 111 includes a containing portion 112 fixed in a personal computer body, and a CD-ROM drive body 121 which is movable along directions $A_1$ and $A_2$ shown in the figures with respect to the containing portion 112.

A housing of the CD-ROM drive body 121 includes a flat lid-less box-shaped frame 123, a top plate 124 fixed on the frame 123, a front panel 122 fixed on the frame 123 and the top plate 124.

Figure 11:
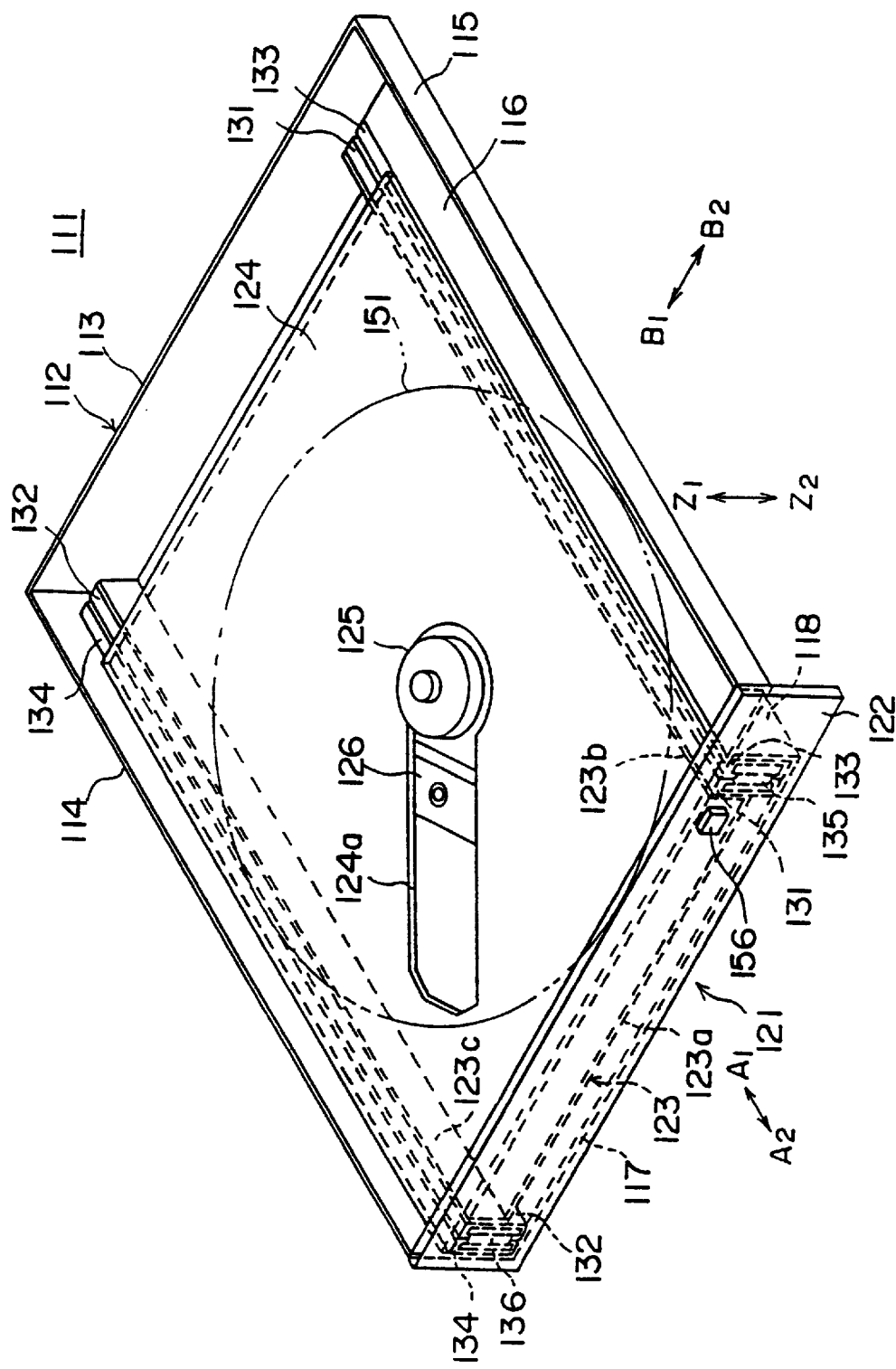
FIG. 11 shows a perspective view of a CD-ROM drive device in a second embodiment of the present invention.

A spindle motor 152 is provided in the frame 123 together with a turn table which is rotated by the turn table 123. Further, an optical head 126, an optical head moving mechanism (not shown in the figures), guide shafts 127 and 128 for guiding movement of the optical head 126, and so forth are provided in the frame 123. An opening 124a is formed in the top plate 124 through which the turn table 125 projects from the top plate 124 and the optical head 126 is exposed as shown in FIG. 11.

Figure 12:
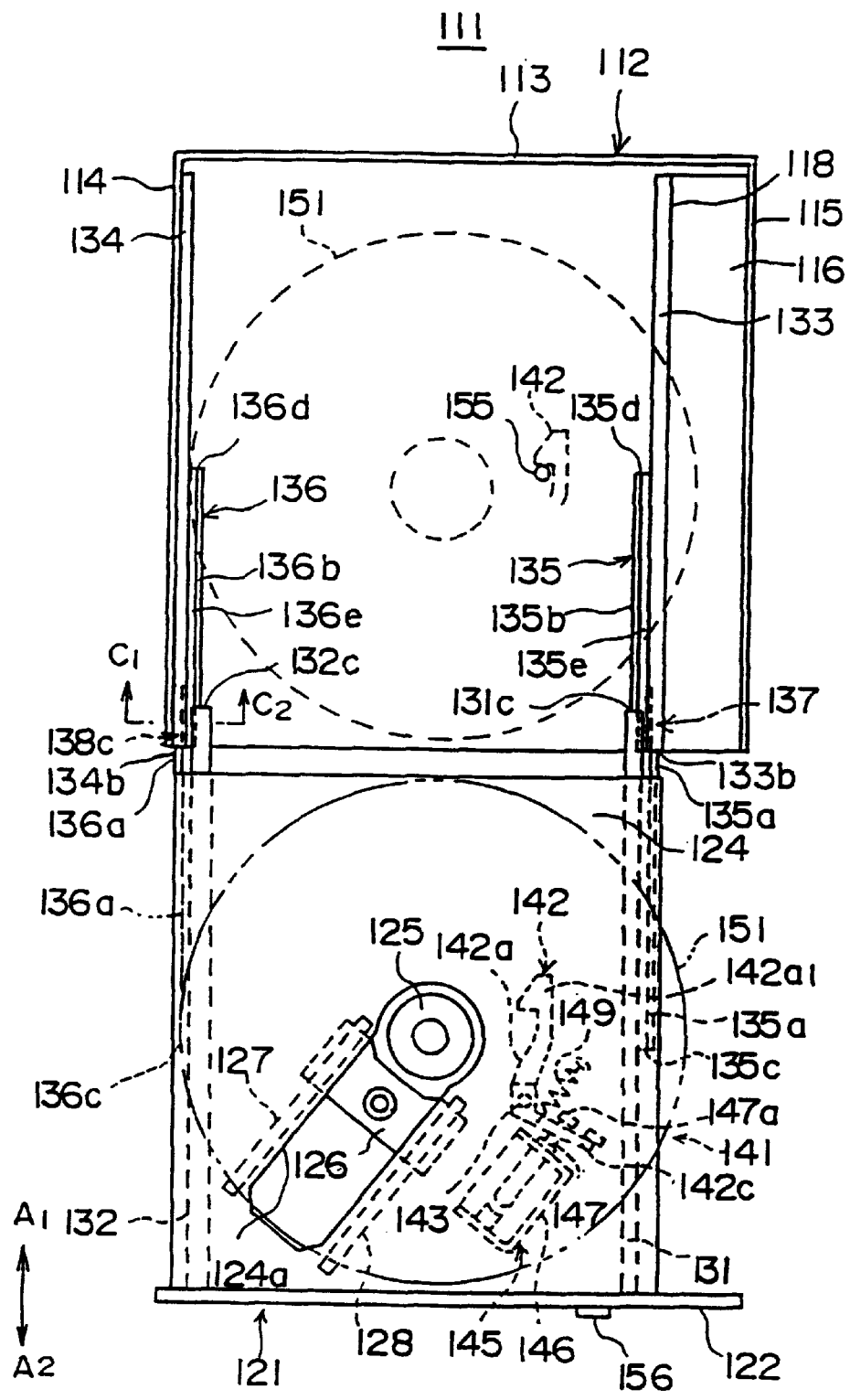
FIG. 12 shows a plan view of the CD-ROM drive device shown in FIG. 11 in a state in which a CD-ROM drive body has been drawn from a containing portion to the limit.

A locking mechanism 141 including plunger body 146 is provided at a front space on a bottom plate 123a of the frame 123. Because the locking mechanism 141 is located near the front end of the CD-ROM drive body 121 as shown in FIG. 12, a spatial arrangement of other parts/components provided in the CD-ROM drive body 121 is not much adversely affected by the presence of the locking mechanism 141. The locking mechanism 141 includes a locking arm 142 rotatably supported on the bottom plate 123a by means of a shaft 143, a spring 149 provided between the locking arm 142 and the bottom plate 123a, and a plunger 145.

When no electric current is supplied to the plunger 145, a force is applied to the locking arm 142 by means of the spring 149 such that the locking arm 142 is rotated counterclockwise about the shaft 143 and then keeps a state shown in FIG. 12. An iron core 147 of the plunger 145 is movable with respect to the plunger body 146 and is attracted into the plunger body 146 when an electric current is supplied to the plunger 145.

Figure 14:
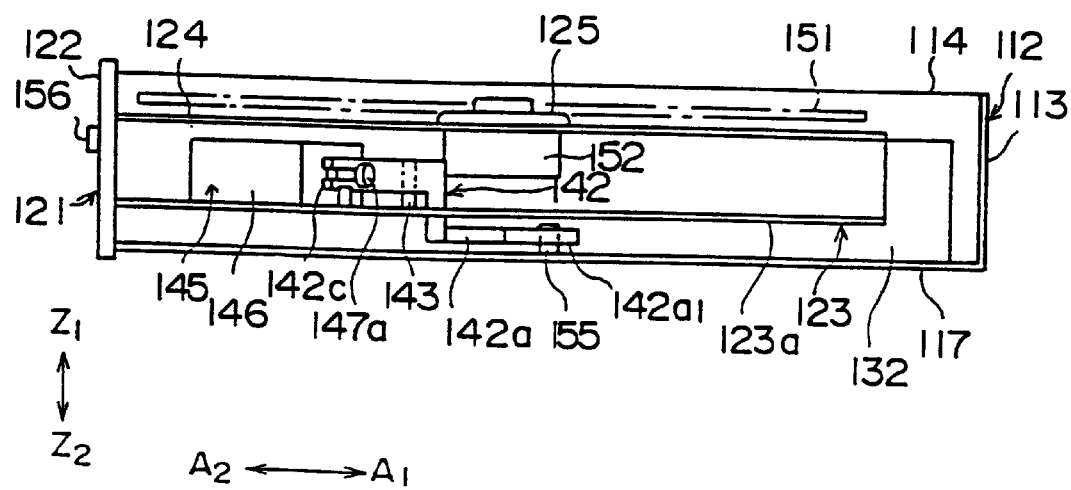
FIG. 14 shows a right side elevational sectional view of the CD-ROM drive device shown in FIG. 11 viewed in a direction $B_1$ shown in FIG. 11.

The containing portion 112 has an approximately flat lid-less box-like shape. A pin 155 projects from a bottom 117 of the containing portion 112. The locking mechanism 141 uses the pin 155. A arm portion 142a of the locking arm 142 is present below the bottom plate 123a of the frame 123 as shown in FIG. 14. The locking arm 142 juts from a space present on the bottom plate 123a to a space present below the bottom plate 123a through an opening (not shown in the figures) formed in the bottom plate 123a. When the CD-ROM drive body 121 is contained in the containing portion 112, a engaging portion $142a_1$, which is provided at an end portion of the arm portion 142a of the locking arm 142, engages with the pin 55 as shown in FIG. 14. Thus, the CD-ROM drive body 121 is locked in the containing portion 112.

A pushing mechanism (not shown in the figures) is provided at a portion in the vicinity of a rear end of CD-ROM drive body 121. The pushing mechanism pushes the CD-ROM drive body 121 contained in the containing portion 112 so as to move the CD-ROM drive body 121 forward in the direction $A_2$.

Figure 13:
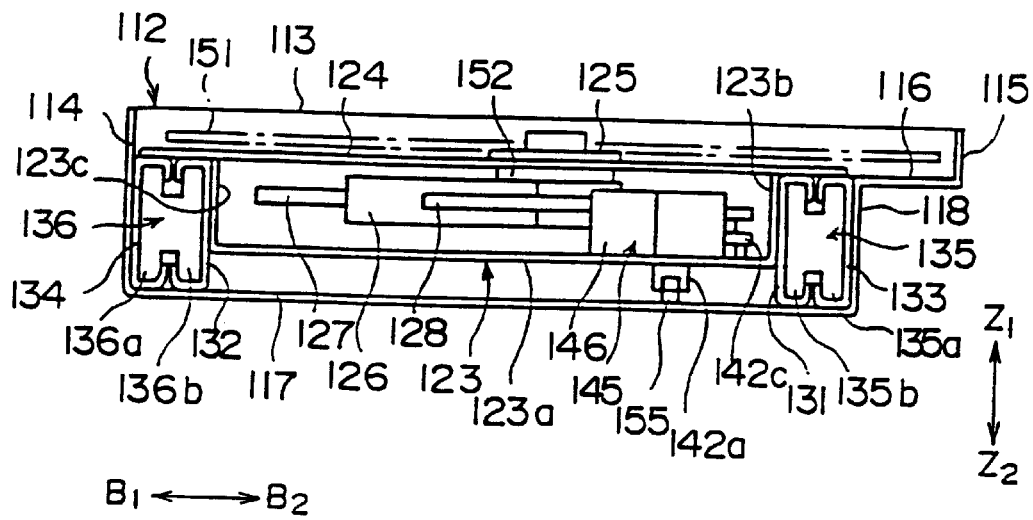
FIG. 13 shows a front sectional view of the CD-ROM drive device shown in FIG. 11 viewed in a direction $A_1$ shown in FIG. 11.

First rail members 133 and 134 extending along the directions $A_1$ and $A_2$ are fixed on side walls 118 and 114 of the containing portion 112 respectively. Each of the rail members 133 and 134 has an approximately angular letter "C" shaped sectional view as shown in FIG. 13. Second rails member 131 and 132 extending also along the directions $A_1$ and $A_2$ are fixed on side walls 123b and 123c of the frame 123 of the CD-ROM drive body 121 respectively. Each of the rails member 131 and 132 also has an approximately angular letter "C" shaped sectional view as shown in FIG. 13.

Further, a coupling member 135, consisting of a first sliding portion 135a, a second sliding portion 135b and an intermediate portion 135e, is provided between the first rail member 133 and the second rail member 131 as shown in FIG. 13. Similarly, a coupling member 136, consisting of a first sliding portion 136a, a second sliding portion 136b and an intermediate portion 136e, is provided between the first rail member 134 and the second rail member 132 as shown in FIG. 13.

Figure 15:
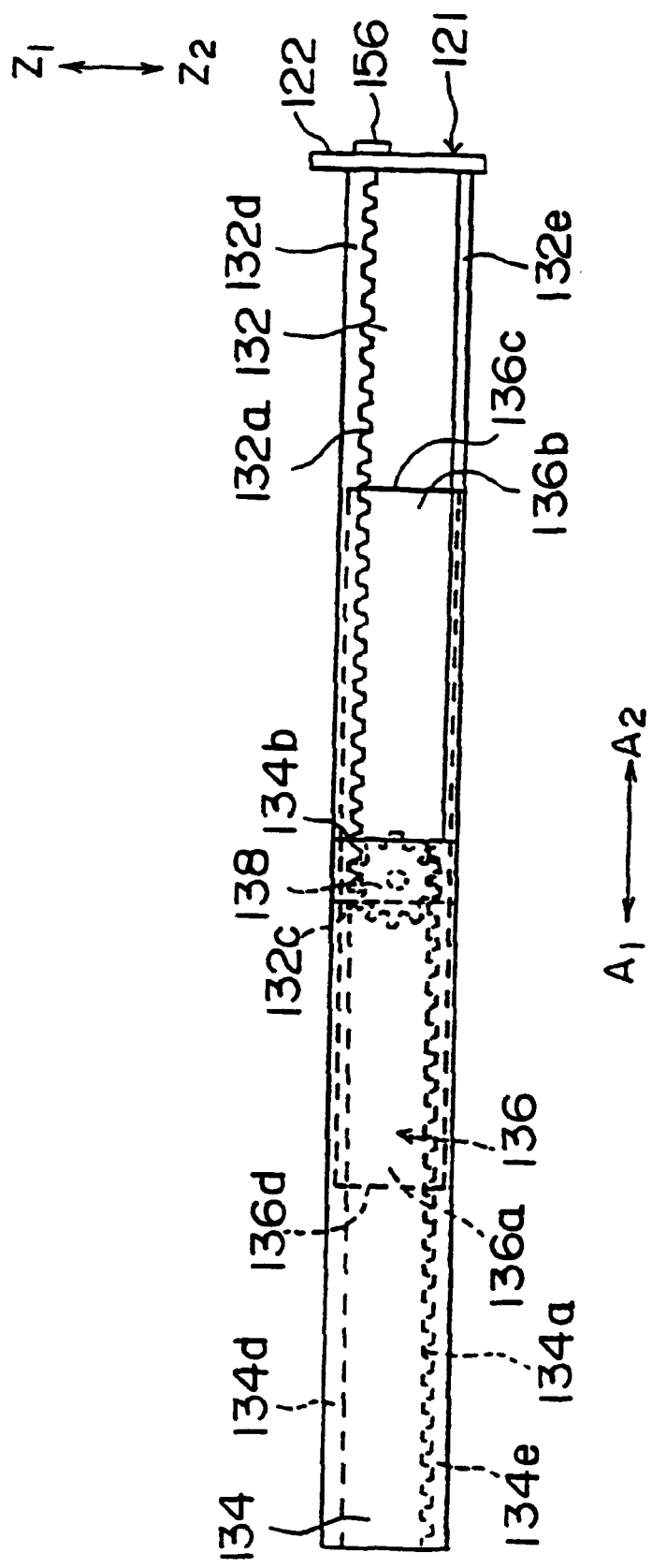
FIG. 15 shows a left side elevational view of a guiding mechanism consisting of rail members and a coupling member of the CD-ROM drive device shown in FIG. 11 viewed in a direction $B_2$ shown in FIG. 11 in the state in which the CD-ROM drive body has been drawn from the containing portion to the limit.
Figure 16:
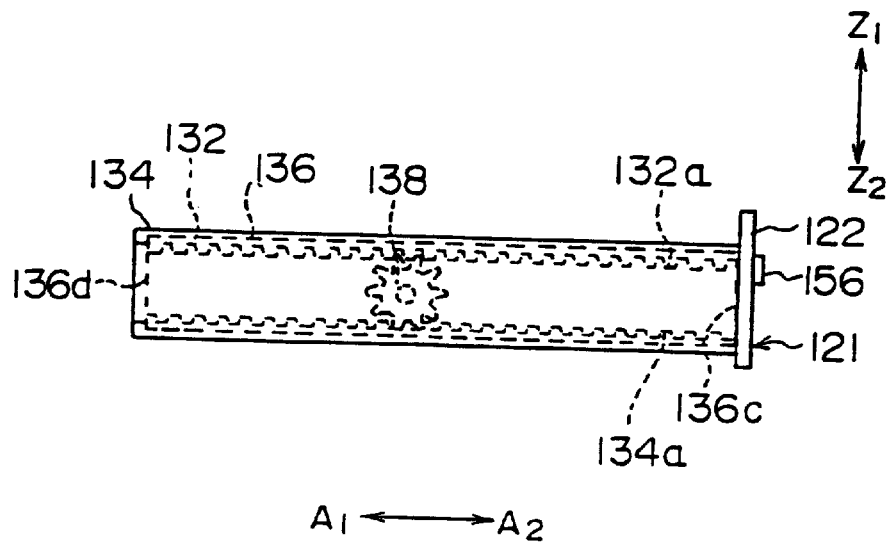
FIG. 16 shows a left side elevational view of the guiding mechanism consisting of rail members and a coupling member of the CD-ROM drive device shown in FIG. 11 viewed in a direction $B_2$ shown in FIG. 11 in a state in which the CD-ROM drive body is contained in the containing portion.
Figure 17:
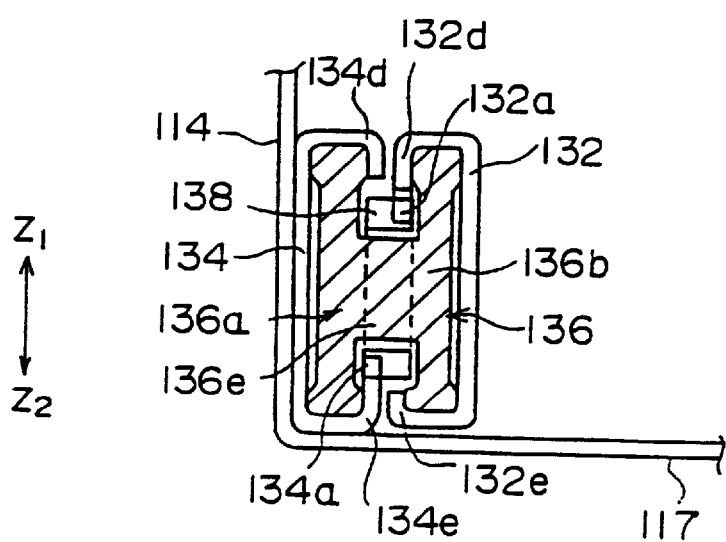
FIG. 17 shows a front sectional view of the guiding mechanism consisting of rail members and a coupling member of the CD-ROM drive device shown in FIG. 11 viewed along a line $C_1$ and $C_2$ shown in FIG. 12.

With reference to FIGS. 15, 16 and 17, performance of the above-mentioned first and second rails members 133, 134, 131 and 132, and coupling members 135 and 136 will now be described. In FIG. 15, for simplifying the description, indicating of a part of the sliding portion 136a of the coupling member 136 is omitted, the part of the sliding portion 136a being a part, behind which the rail member 132 is present in FIG. 15.

As shown in FIG. 17, the rail member 134 has a top edge portion 134d extending downward and a bottom edge portion 134e extending upward. A top end of the bottom edge portion 134e has a rack 134a formed thereon acting a rack gear of a well-known rack and pinion engagement. The rail member 134 has a length along the directions $A_1$ and $A_2$ approximately reaching an entire length of the side wall 114 of the containing portion 112 as shown in FIG. 12. Thus, a front end 134b of the rail member 134 is aligned with a front end of the side wall 114 along a direction perpendicular to the directions $A_1$ and $A_2$. A rear end of the rail member 134 approximately reaches a rear wall of the containing portion 112.

As shown in FIG. 17, the rail member 132 has a top edge portion 132d extending downward and a bottom edge portion 132e extending upward. A bottom end of the top edge portion 132d has a rack 132a formed thereon acting a rack gear of a rack and pinion engagement. The rail member 132 has a length along the directions $A_1$ and $A_2$ approximately the same as the length of the rail member 134. A rear end 132c of the rail member 132 slightly projects backward from a rear end of the CD-ROM drive body 121 as shown in FIG. 12. A front end of the rail member 132 reaches the front panel 112 of the CD-ROM drive body 121.

Each of the sliding portions 136a and 136b of the coupling member 136 has a plate-like shape extending along the directions $A_1$ and $A_2$. The sliding members 136a and 136b are connected with each other via the intermediate portion 136e so that the sliding members 136a and 136b are in parallel with each other. Further, in the coupling member 136, front ends of the sliding portions 136a and 136b and the intermediate portion 136e are aligned with one another along a direction perpendicular to the directions $A_1$ and $A_2$, and also rear ends of the sliding portions 136a and 136b and the intermediate portion 136e are aligned with one another along a direction perpendicular to the directions $A_1$ and $A_2$. As shown in FIGS. 12, 15 and 17, the sliding portion 136a is fitted into an inside space of the rail member 134. This being fitted into is such that the sliding portion 136a is slidable in the rail member 134 in the directions $A_1$ and $A_2$. For this purpose, an outer height of the sliding portion 136a measured along directions $Z_1$ and $Z_2$ shown in FIG. 17 is slightly shorter than an inner height of the rail member 134. Similarly, the sliding portion 136b is fitted into an inside space of the rail member 132. This being fitted into is such that the sliding portion 136b is slidable in the rail member 132 in the directions $A_1$ and $A_2$. For this purpose, an outer height of the sliding portion 136b measured along directions $Z_1$ and $Z_2$ is slightly shorter than an inner height of the rail member 132.

A length of the coupling member 136 in the directions $A_1$ and $A_2$ is slightly shorter than a length of the rail member 134. A gear 138 acting as a pinion of a rack and pinion engagement is rotatably supported on the coupling member 136 at a position in the vicinity of the center of the coupling member 136. An approximate space for containing the gear 138 is provided in the coupling member 136. As shown in FIGS. 16 and 17, the gear 138 engages with the rack 134a of the rail member 134 so as to form a rack and pinion engagement. Similarly, the gear 138 engages with the rack 132a of the rail member 132 so as to form another rack and pinion engagement.

Performance of the above-mentioned rack and pinion engagements will now be described. As the rail member 132 moves along the direction $A_1$ and $A_2$ with respect to the rail member 134, the gear 138 is rotated so as to follow the above-mentioned movement of the rail member 132. That is, the rack 132a of the rail member 132 rotates the gear 138 and the rotation of the gear 138 cause the gear to roll on the rack 134a of the rail member 134 along the directions $A_1$ and $A_2$. Because the gear 138 is rotatably supported on the coupling member 136 as mentioned above, the coupling member 136 also moves along the directions $A_1$ and $A_2$ in response to the above-mentioned movement of the rail member 132.

In this performance, a moving distance of the gear 138, that is, a moving distance of the coupling member 136, along the directions $A_1$ and $A_2$, is half a moving distance of the rail member 132 with respect to the rail member 134.

As shown in FIGS. 12 and 13, structure of the rail members 133, 131 and coupling member 135 is symmetrical with the structure of the rail member 134, 132 and the coupling member 136 about a symmetrical axis. This symmetrical axis extends at the center between a set of the members 133, 131, and 135 and another set of the members 134, 132, and 136 along the directions $A_1$ and $A_2$. Thus, performance of a combination of the rail member 133, the coupling member 135 and the rail member 131 is substantially the same as the above-described performance of the combination of the rail members 134, the coupling member 136 and the rail member 132. Therefore, description on the set of the members 133, 131 and 135 will be omitted. The rail members 131 and 132 are thus effectively guided by the coupling members 135 and 136 and the rail members 133 and 134. Therefore, the CD-ROM drive body 121 can smoothly and stably move along the directions $A_1$ and $A_2$ with respect to the containing portion 112.

Performance of the CD-ROM drive device 111 in drawing the CD-ROM drive body 121 in the direction $A_2$ and inserting it in the direction $A_1$ will now be described.

FIGS. 11 and 16 show a state in which the CD-ROM drive body 121 is contained in the containing portion 112. In this state, no electric current is supplied to the plunger 145 and thus the engaging portion $142a_1$ of the locking arm 142 engages with the pin 155. Thus, the CD-ROM drive body 121 is locked in the containing portion 112 and thus is prevented from being drawn in the direction $A_2$.

In this state, the sliding portions 136a and 136b of the coupling member 136 are fitted to the rail members 134 and 132 respectively for the entire length of the coupling member 136. Therefore, the coupling member 136 is almost prevented from disadvantageously moving in a certain manner with respect to the rail member 134. The above-mentioned disadvantageous moving in the certain manner with respect to the rail member 134 is moving in directions perpendicular to the directions $A_1$ and $A_2$, in particular, is moving including inclining with respect to the rail member 134. Similarly, the rail member 132 is almost prevented from disadvantageously moving in the certain manner with respect to the coupling member 136. Similarly, the sliding portions 135*a* and 135*b* of the coupling member 135 are fitted to the rail members 133 and 131 respectively for the entire length of the coupling member 135. Therefore, the coupling member 135 is almost prevented from disadvantageously moving in the certain manner with respect to the rail member 133. Similarly, the rail member 131 is almost prevented from disadvantageously moving in the certain manner with respect to the coupling member 135. As a result, the CD-ROM drive body 121 is almost prevented from disadvantageously moving in the certain manner with respect to the containing portion 112.

When an operator presses an ejecting button 156 provided on the front panel 122 shown in FIGS. 11, 12 and 14, a control unit (not shown in the figures) provided in the CD-ROM drive device 111 detects this operator's pressing of the ejecting button 156. As a result, the control unit supplies an electric current to the plunger 145 for an appropriate duration, which plunger 145 thus moves its iron core 147 toward the plunger body 146. Thus, the end portion 147*a* of the iron core 147 comes into contact with the end portion 142*c* of the locking arm 142. As a result, the locking arm 142 is rotated clockwise about the shaft 143 and thus the engaging portion 142*a*$_1$ is disengaged from the pin 155. As a result, the locking of the CD-ROM drive body 121 in the containing portion 112 is released. The supply of the electric current to the plunger 145 is terminated and thus the locking arm 142 is rotated counterclockwise by means of the spring 149 so as to return to its original state.

After the locking of the CD-ROM drive body 121 has been released as mentioned above, the above-mentioned pushing mechanism pushes the CD-ROM drive body 121 forward (in the direction $A_2$) for a predetermined length, as the rail members 131 and 132 of the CD-ROM drive body 121 being guided by the coupling members 135 and 136.

After that, the operator may pull the front panel 122 and thus draw the CD-ROM drive body 121 in the direction $A_2$. Thus, the rail members 131 and 132 move in the direction $A_2$. As a result, the gears 137 and 138 are rotated and thus the coupling members 135 and 136 move in the direction $A_2$. A length for which each of the coupling members moves is half of a length for which each of the rail members 131 and 132 moves.

FIGS. 12 and 15 show a state in which the CD-ROM drive body 121 has been drawn in the direction $A_2$ to the limit. In this state, each of the coupling members 135 and 136 has moved in the direction $A_2$ for a length half of a length for which the CD-ROM drive body 121 has been drawn, that is, a length for which each of the rail members 131 and 132 has moved. The front end 135*c* of the coupling member 135 is located at a position in proximity to the center of the rail member 131, and the rear end 135*d* of the coupling member 135 is located at a position in proximity to the center of the rail member 133, as shown in FIGS. 12 and 15. Similarly, the front end 136*c* of the coupling member 136 is located at a position in proximity to the center of the rail member 132, and the rear end 136*d* of the coupling member 136 is located at a position in proximity to the center of the rail member 134, as shown in FIGS. 12 and 15.

Therefore, an approximately half length of the entire length of each of the sliding portions 135*a* and 135*b* of the coupling member 135 is fitted to a respective one of the rail members 133 and 135. Similarly, an approximately half length of the entire length of each of the sliding portions 136*a* and 136*b* of the coupling member 136 is fitted to a respective one of the rail members 134 and 132.

Figure 3:
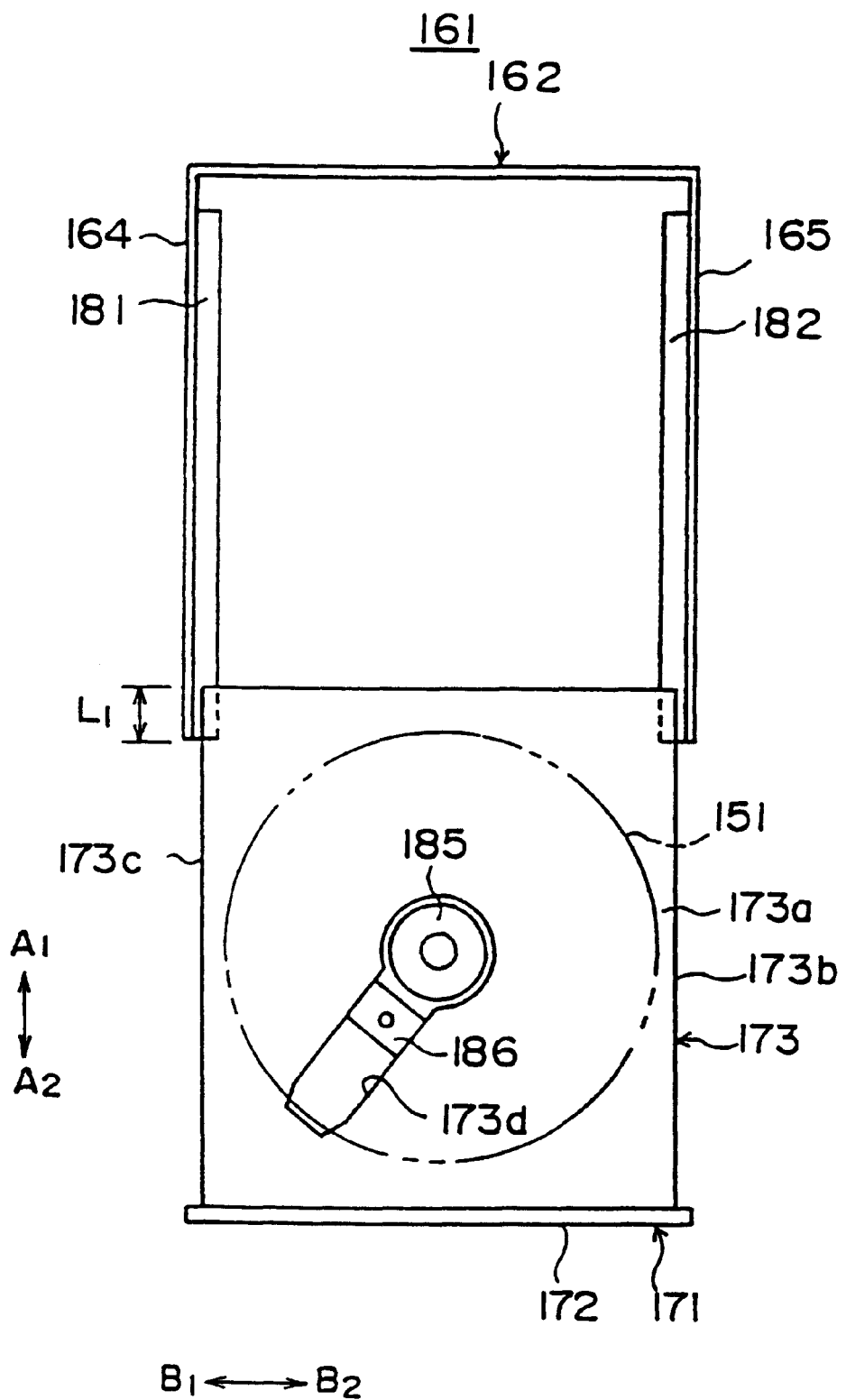
FIG. 3 shows a plan view of a CD-ROM drive device in still another example in the related art.
Figure 4:
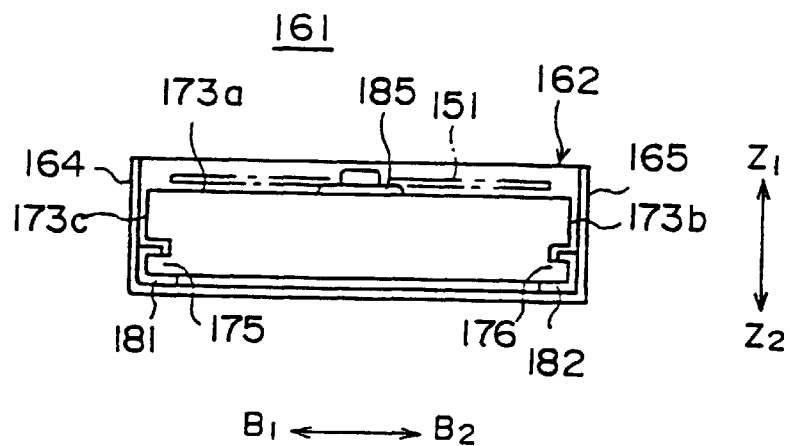
FIG. 4 shows a front elevational view of the CD-ROM drive device shown in FIG. 3.
Figure 5:
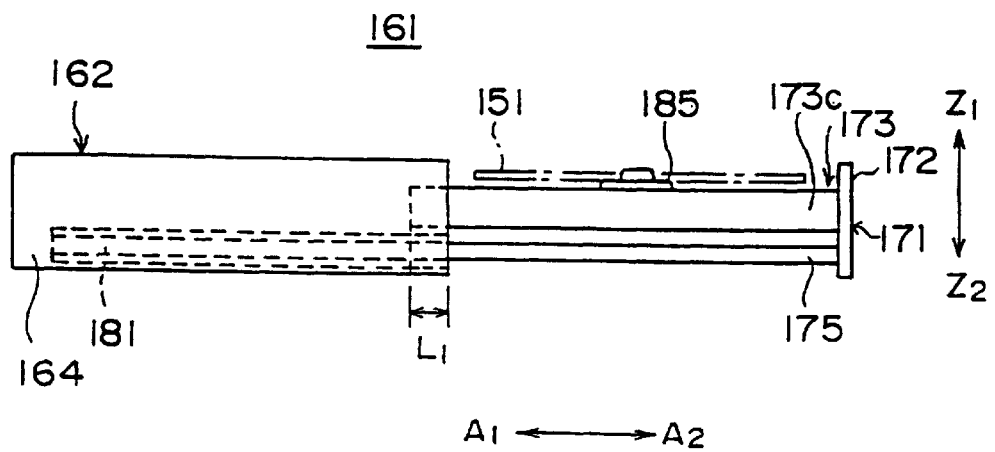
FIG. 5 shows a left side elevational view of the CD-ROM drive device shown in FIG. 3.

Thus, even in the state in which the CD-ROM drive body 121 has been drawn to the limit in the direction $A_2$, that is, in the state in which the CD-ROM drive body 121 has projected from the containing portion 112 to the limit, the approximately half length of the entire length of each of the rail members 131 and 132 is fitted to a respective one of the sliding members 135*b* and 136*b*. The rail members 131 and 132 are mounted on the CD-ROM drive body 121 as mentioned above. Similarly, the approximately half length of the entire length of each of the rail members 133 and 134 is fitted to a respective one of the sliding members 135*a* and 136*a*. The rail members 131 and 132 are mounted in the containing portion 112 as mentioned above. In contrast to this, only an approximately 10% of the entire length of each of the rail members 181 and 182 shown in FIG. 3 is fitted to a respective one of the guides 175 and 176 in the CD-ROM drive device in the related art. Thus, in the CD-ROM drive device in the second embodiment of to the present invention, a length in the directions $A_1$ and $A_2$ for which the CD-ROM drive body 121 engages with the containing portion 112 is longer than that in the device in the related art. As a result, the above-described disadvantageous moving of the CD-ROM drive body 121 in the certain manner with respect to the containing portion 112 can be greatly prevented.

Assuming that, for example, a length for which the CD-ROM drive body 121 has moved after it has been drawn in the direction $A_2$ from the containing portion 112 to the limit is 120 mm, it is possible to provide approximately 70 mm of a length for which each of the coupling members 135 and 136 is fitted to a respective one of the rail members 131, 132, 133 and 134. As a result, it is possible to greatly reduce the above-mentioned disadvantageous moving of the CD-ROM drive body 121 in the certain manner. In fact, even in the state in which the CD-ROM drive body 121 has projected from the containing portion 112 to the limit, a maximum possible length in the vertical directions $Z_1$ and $Z_2$ shown in FIGS. 11, 13, 15 and 16 for which the front end of the CD-ROM drive body 121 moves with respect to the containing portion 112 is only approximately 0.5 mm. Similarly, a maximum possible length for which the front end of the CD-ROM drive body 121 moves with respect to the containing portion 112 in the left and right directions $B_1$ and $B_2$ shown in FIGS. 11, 12, 13 and 17 can be greatly reduced.

Further, in the embodiment of the present invention, as described above, the CD-ROM drive body 121 has the rail members 131 and 132 on both sides thereof. Thus, the CD-ROM drive device has two sets of guiding mechanisms, one consisting of the rail members 131, 133 and the coupling member 135 and the other consisting of the rail members 132 and 134 and the coupling member 136. In comparison to a case in which only a single guiding mechanism was provided, the provision of the two guiding mechanisms in the device in the embodiment of the present invention can effectively reduce the above-mentioned disadvantageous moving of the CD-ROM drive body 121. In the two guiding mechanisms, the two coupling members 135 and 136 are aligned with each other along the directions $B_1$ and $B_2$ while the CD-ROM drive body 121 is being projected from the containing portion 112 and simultaneously the coupling members 135 and 136 are moving accordingly as described above. Therefore, the above-mentioned disadvantageous moving of the CD-ROM drive device 121 can be effectively reduced.

After the operator has drawn the CD-ROM drive body 121 from the containing portion 112 to the limit as described above, the operator may take out the CD-ROM 151 which has been placed on the turn table 125 of the CD-ROM drive body 121, and then appropriately put another CD-ROM 151 on the turn table 125 of the CD-ROM drive body 121.

If the operator wishes to cause the one drawn CD-ROM drive body 121 to be contained in the containing portion 112, the operator may press the CD-ROM drive body 121 in the direction $A_1$ shown in FIG. 11. If the operator has pressed the CD-ROM drive device 121 as mentioned above and thus the CD-ROM drive device 121 is in a state in which containing of the CD-ROM drive device 121 in the containing portion 112 is almost completed, the end of the engaging portion 142a of the locking arm 142 comes into contact with the pin 155. The locking arm 142 is then rotated clockwise and thus the engaging portion $142a_1$ engages with the pin 55. Thus, the CD-ROM drive body 121 is locked in the containing portion 112 and thus the containing of the CD-ROM drive body 121 in the containing portion 112 is completed.

The CD-ROM 151 placed on the turn table 125 is located, as shown in FIGS. 13 and 14, over the top plate 124 of the CD-ROM drive body 121 and is located in a height lower than a height in which the top ends of side walls 114 and 115 and a rear wall 113 of the containing portion 112 shown in FIG. 12. Further as shown in FIGS. 11 and 13, a right end of the CD-ROM 151 juts rightward from an edge portion 116 provided at the right side of the containing portion 112.

The positions of the racks 132a and 134a of the rail members 132 and 134 are not limited to those shown in FIG. 17. It is possible that, instead of the structure shown in FIG. 17, the rack 132a is formed on the bottom edge portion 132a and the rack 134a is formed on the top edge portion 134d. Similar modification can be also applied to the racks of the rail members 131 and 133.

With reference to FIGS. 18 through 21, a CD-ROM drive device 201 (which will be simply referred to as a device, hereinafter) in a third embodiment of a disc device according to the present invention will now be described. The CD-ROM drive device 201 is a disc device which is incorporated into a frame of a notebook type personal computer (not shown in the figures).

The device 201 includes a tray 202 on which a disc will be placed, a sub-chassis 203 (shown in FIG. 20) which supports the tray 202, a tray sliding mechanism 204 which supports the tray 202 so that the tray 202 can freely slide with respect to a chassis 210, an optical pick up unit 205 provided on the sub-chassis 203, a turn table 206 for rotating the disc (CD-ROM) placed on the turn table 206, a holding mechanism 207 which holds the tray 202 when the tray 202 has moved to a disc replacement position, and a locking mechanism 208 which locks the tray 202 when the tray has moved to a disc loading position.

Figure 18:
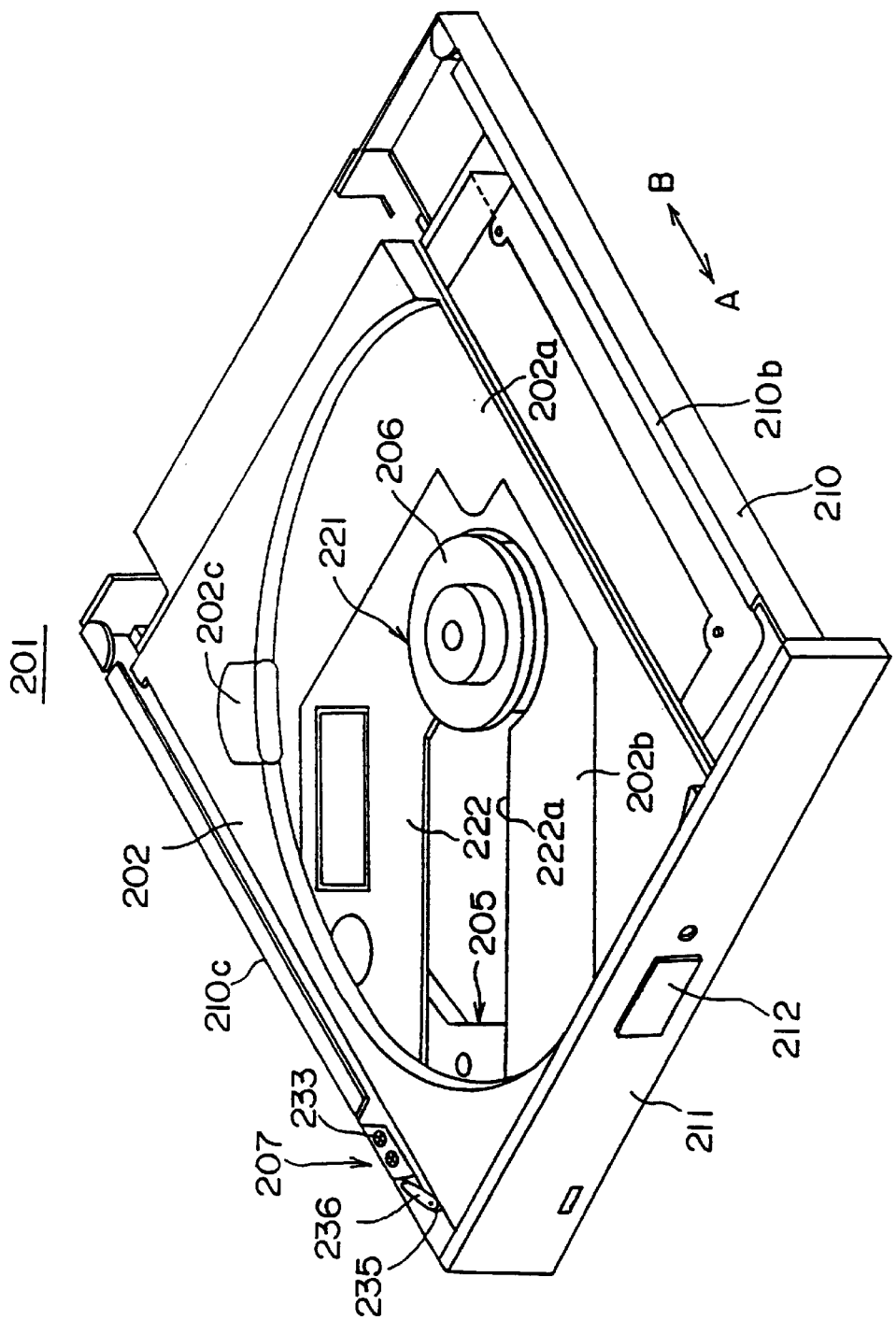
FIG. 18 shows a perspective view of a CD-ROM drive device in a third embodiment of the present invention.
Figure 19:
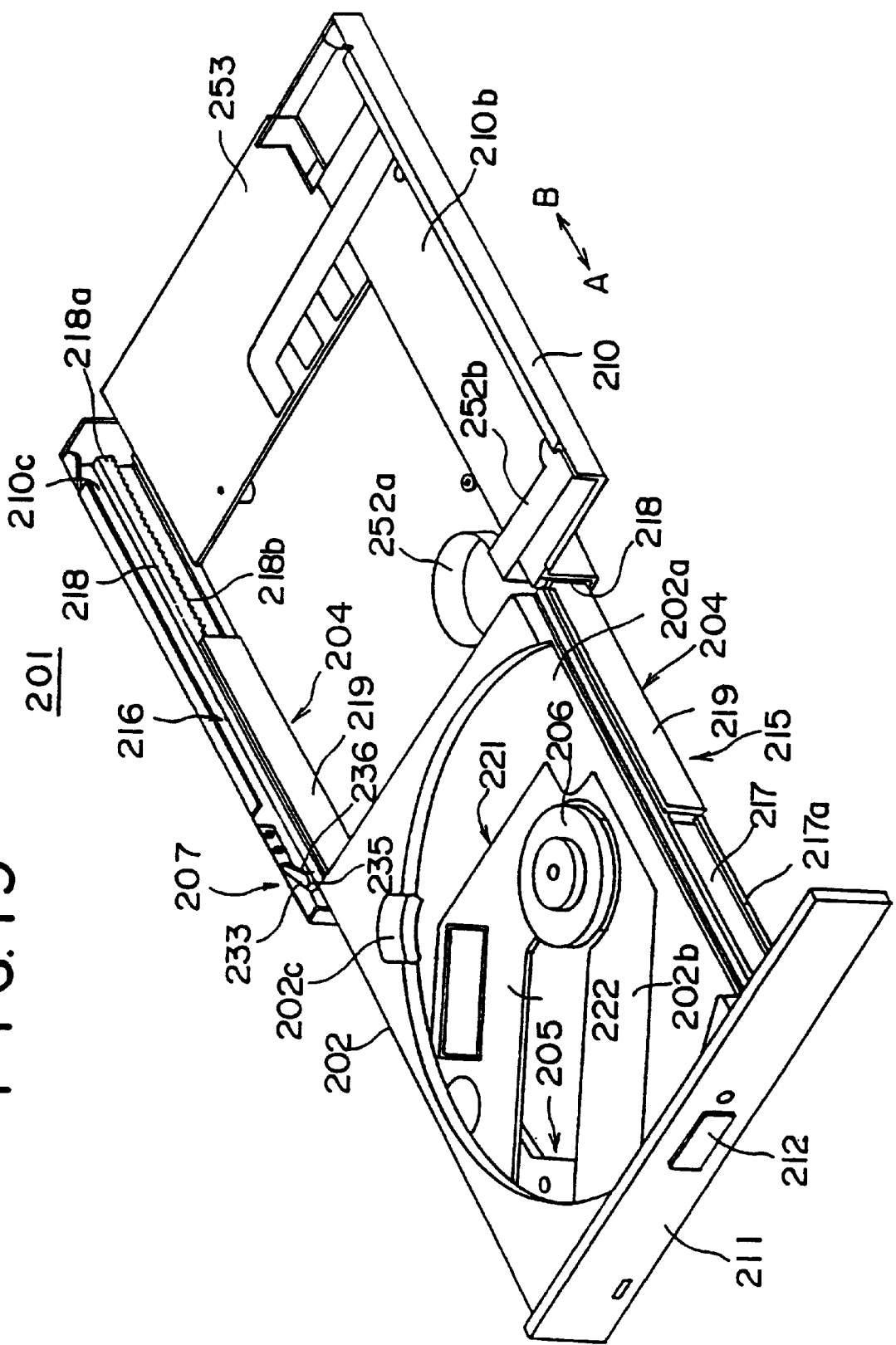
FIG. 19 shows a perspective view of the CD-ROM drive device shown in FIG. 18 but in which a tray has projected from a containing portion.

FIG. 18 shows a state in which the tray 202 has moved to the disc loading position. Further, FIG. 18 shows a state in which a top plate 209 (shown in FIG. 20) has been removed for the sake of easy description. In the disc loading position, the tray 202 is contained in the device 201. FIG. 19 shows a state in which the tray 202 has moved to the disc replacement position. Further, FIG. 19 shows a state in which the top plate 209 has been removed for the sake of easy description. In the disc replacement position, the tray 202 has projected from the device 201.

Figure 22A:
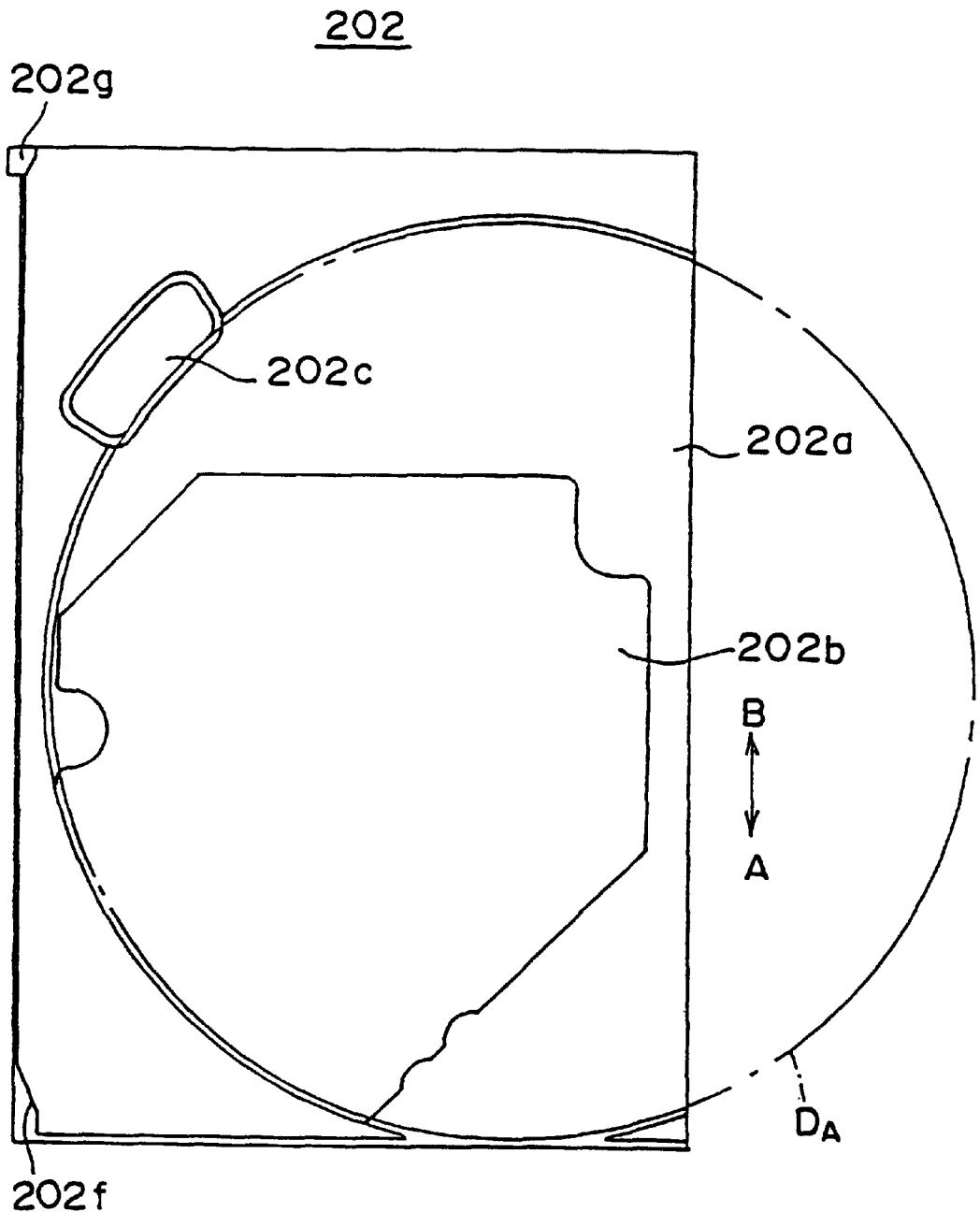
FIGS. 22A and 22B show a plan view and front view of the tray of the CD-ROM drive device shown in FIG. 18.

As shown in FIG. 22A, the tray 202 has a shape such that a right end part of the disc $D_A$ juts rightward from the tray 202. That is, a width of the tray 202 measured along a direction perpendicular to directions A and B shown in FIG. 18 is shorter than an outer diameter of the disc. The tray 202 moves in either the direction A or the direction B between the disc replacement position and the disc loading position, as an operator manipulates the tray 202. Therefore, no driving mechanism is not provided such as that consisting of a motor and a power transmission mechanism or the like for driving the tray 202 in the directions A and B. As a result, a number of components included in the device 201 can be reduced and thus miniaturization and thinning of the device 201 can be achieved.

With reference to FIGS. 19 and 21, the chassis 210 includes a containing portion 210a for containing each component described above, and a cover portion 210b extending rightward so as to cover a bottom of the above-mentioned jutted right end part of the disc and thus protect it. As shown in FIG. 19, a free space is present below the cover portion 210b and at the right side of the containing portion 210a. This space may be used to contain any components included in the notebook type personal computer which incorporates the device 201.

A front bezel 211 is fixed on the front end of the tray 202 and thus slides with respect to the chassis 210 in the directions A and B together with the tray 202. A switch button 212 is provided at the center of the front bezel 211 and is used to release locking which is performed by the locking mechanism 208, the releasing being performed so as to allow the tray 202 to be drawn. If the switch button 212 is manipulated in an ON manner when the device 201 is in the state shown in FIG. 18, the tray 202 automatically projects from chassis 210, as will be described later, and thus the front bezel 211 projects for approximately 5 through 10 mm forward in the direction A. As a result, it is easy for the operator to pull the tray 202.

Figure 20:
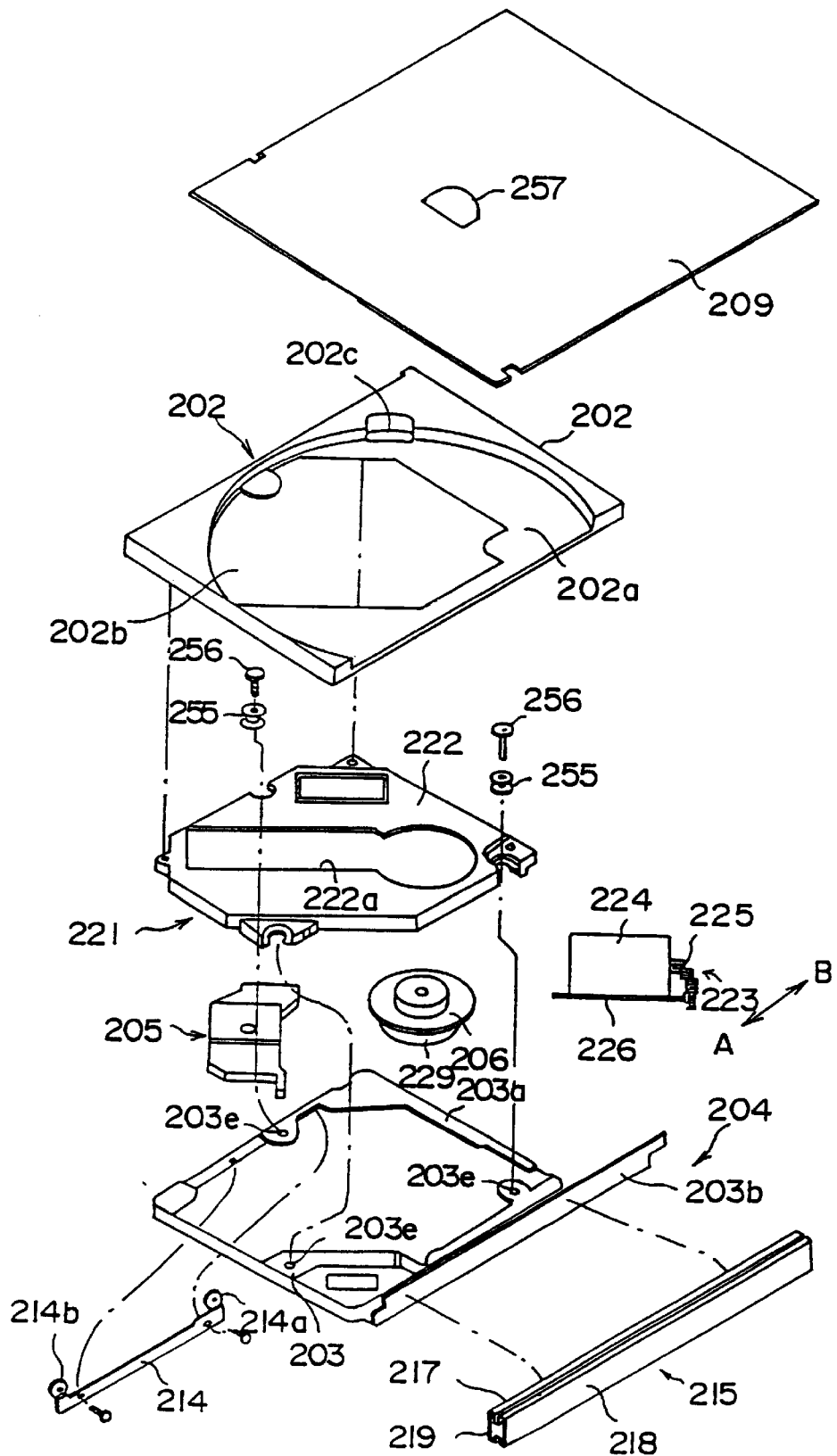
FIG. 20 shows an exploded perspective view of upper part of the CD-ROM drive device shown in FIG. 18.
Figure 22B:
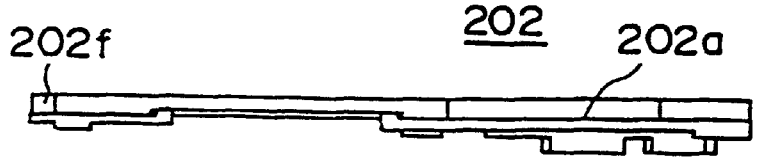

As shown in FIGS. 20, 22A and 22B, the tray 202 includes a disc facing portion 202a which consists of a plane surface for facing a disc plane surface and forming a space thereon, the space receiving the disc. An opening 202b is formed in the disc facing portion 202a and is used for the pick up and the turn table. Further, another opening 202c is formed for an operator to insert the operator's finger and to pick up the disc placed on the disc facing portion 202a of the tray 202.

A dimension of the disc facing portion 202a measured along a direction perpendicular to the directions A and B is slightly smaller than the width of the containing portion 210a measured along the direction perpendicular to the directions A and B. However, almost all length of the width of the containing portion 210a is covered by the relevant dimension of the disc facing portion 202a. As shown in FIG. 22A, an area of a combination of the disc facing portion 202a and the opening 202b is approximately ⅔ of an area of a disc top surface. As mentioned above, the tray 202 has the shape such that the right end part of the disc $D_A$ juts rightward from the tray 202. That i8s, the right end part of the disc $D_A$ juts from the right end of the disc facing portion 202a.

When an operator wishes to pick up the disc placed on the tray 202, the operator may take the thus-jutted part of the disc with the operator's fingers. Therefore, it is not necessary to provide a concavity in the tray 202 particularly for the operator to take the disc with the operator's fingers. In the structure shown in FIG. 22A, the operator may freely use a space present at the right side of the tray 202 to take the disc with the operator's fingers. Because a relatively large part of the disc juts from the right end of the tray 202 as shown in FIG. 22A, the operator may use any positions of the jutted part when the operator takes the disc with the operator's fingers. Thus, the operator can easily and also surely pick the disc up from the tray 202. When the operator picks up the disc with the operator's fingers, the operator takes the jutted right side part of the disc with fingers of the operator's right hand, and inserts a finger of the operator's left hand into the opening 202c, thus hooking the left end of the disc with the finger of the left hand.

As shown in FIG. 22A, the opening 202c is formed at a portion of the tray 202 near to a corner thereof but not at a portion thereof near to the left end of the disc facing portion 202a. Thus, the provision of the opening 202c does not cause the width, in the horizontal direction in FIG. 22A, of the tray 202 to be wider. As a result, the horizontal direction width of the tray 202 can be further reduced, great miniaturization of the tray 202 being thus achieved. Therefore, miniaturization of the device 201 can be achieved. In fact, a relevant width of the containing portion 210a can be reduced accordingly.

With reference to FIGS. 20, 23A, 23B and 23C, the sub-chassis 203 includes a square-shaped frame 203a on which the tray 202 is placed and fixed, the frame 203a having an opening for the pick up and turn table. The sub-chassis 203 further includes a bracket 203b extending along the directions A and B and provided at a right side wall of the frame 203a. The sub-chassis 203 further includes a guide rail pulling member 214 screwed on a left side wall 203c of the frame 203a. The guide rail pulling member 214 has a pair of pulling portions 214a and 214b upward projecting from the frame 203a. Further, the frame 203a is provided with a mounting portion 246 for mounting an extending member 249 which supports an ejecting pushing member 248 shown in FIG. 42 as will be described later. The frame 203a is further provided with a screw hole 203e to be used to screw a base 222 via vibration absorbing members 255.

With reference to FIGS. 20, 21, 24, 25, 26, and 27, the tray sliding mechanism 204 has a pair of guide rail mechanisms 215 and 216 mounted on both sides of the sub-chassis 203.

Each of the guide rail mechanisms 215 and 216 includes a moving rail 217 fixed on the bracket 203b of the sub-chassis 203, a static rail 218 extending in parallel to the movable rail 217, a sliding rail 219 present between the moving rail 217 and the static rail 218 and engaging with the rails 217 and 218 in a manner in which the sliding rail 219 is slidable on each of the rails 217 and 218.

Figure 25:
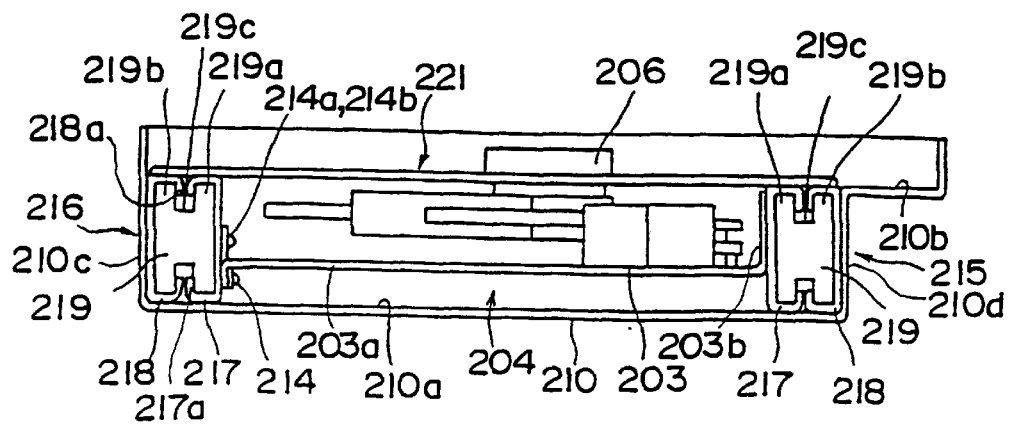
FIG. 25 shows a sectional front elevational view of the CD-ROM drive device shown in FIG. 18 illustrating the guide rail mechanisms and pulling member.
Figure 26:
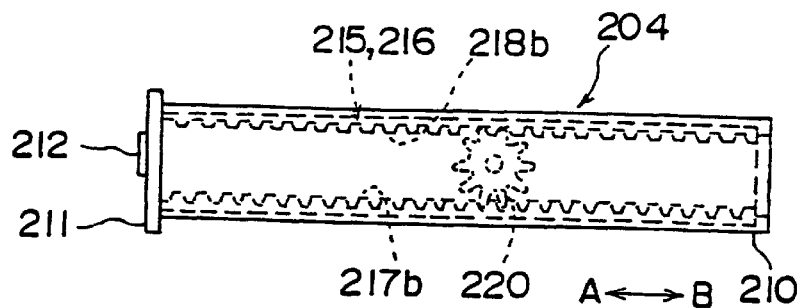
FIG. 26 shows a side elevational view of the guide rail mechanism when the tray has been contained in the containing portion.

Each rail of the moving rail 217 and the static rail 218 has a cross sectional shape like an angular letter "C" as shown in FIGS. 21 and 25. Each of the rails 217 and 218 has a respective one of edge portions 217a and 218a formed thereon as a result of bending ends of the rails so as to approach each other. The edge portion 217a is a bottom edge portion of the moving rail 217 and is provided with a rack gear 217b formed therein extending along a longitudinal direction of the rail. The edge portion 218a is a top edge portion of the static rail 218 and is provided with a rack gear 218b formed therein extending along the longitudinal direction of the rail.

As shown in FIGS. 21 and 25, the sliding rail 219 has a cross sectional shape like a letter "H". The sliding rail 219 has a first track 219a with which the edge portion 217a of the moving rail 217 engages, and a second track 219b with which the edge portion 218a of the static rail 218 engages, and a groove 219c present between the first and second tracks 219a and 219b. A pinion gear 220 is contained in the groove 219c at the center on the longitudinal direction. The pinion gear 220 is supported in the sliding rail 219 in a manner in which the pinion gear 220 is rotatable. Each one of the rack gears 217b and 218b of the moving and static rails 217 and 218 engages with a respective one of a top end portion and a bottom end portion of the pinion gear 220.

Figure 27:
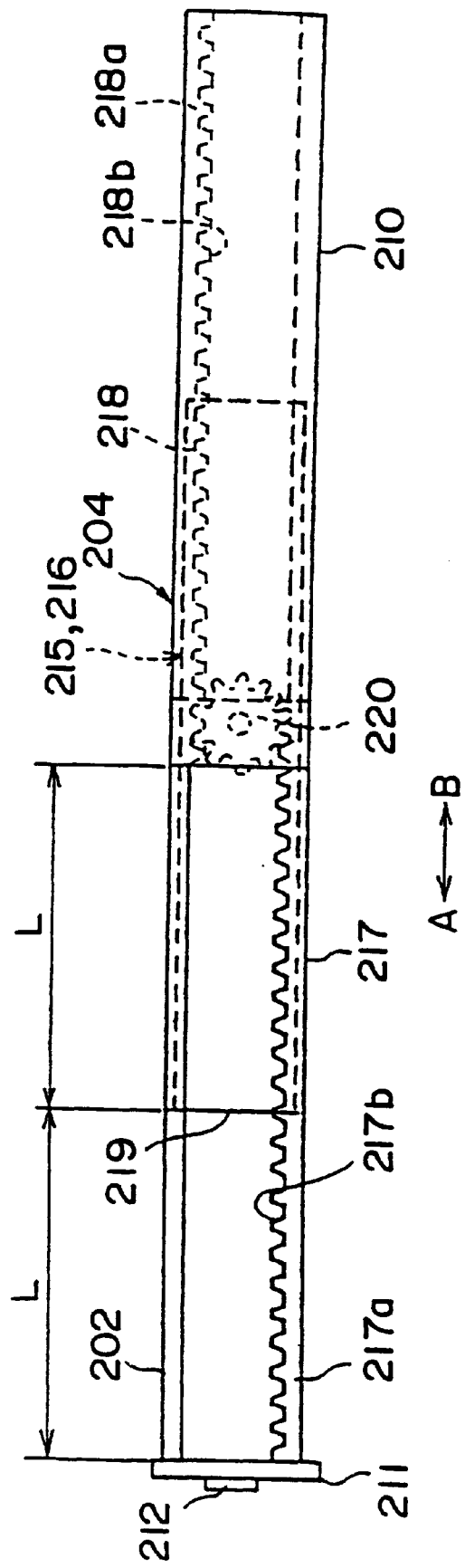
FIG. 27 shows a side elevational view of a guide rail mechanism when the tray has projected from the containing portion.

As shown in FIG. 25, the static rail 218 of the guide rail mechanism 215 is screwed on a right side wall 210d of the chassis 210. The moving rail 217 is screwed on the bracket 203b of the sub-chassis 203 which supports the tray 202. When the tray 202 is drawn by an operator in the direction A shown in FIG. 19, as shown in FIG. 27, the moving rail 217 slides on the sliding rail 219 in the direction A and simultaneously the pinion gear 220 is rotated due to this sliding. Further, as the pinion gear 220 is thus rotated, simultaneously, the sliding rail 219 slides on the static rail 218 in the direction A.

Figure 28A:
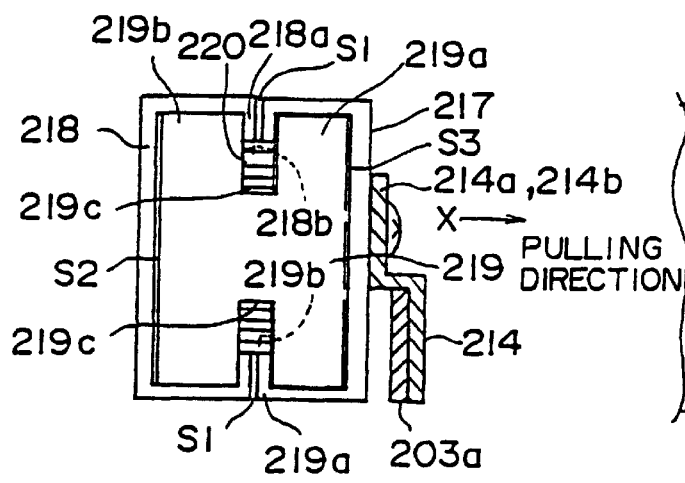
FIGS. 28A, 28B, and 28C are magnified views of the guide rail mechanism and pulling member.
Figure 28C:
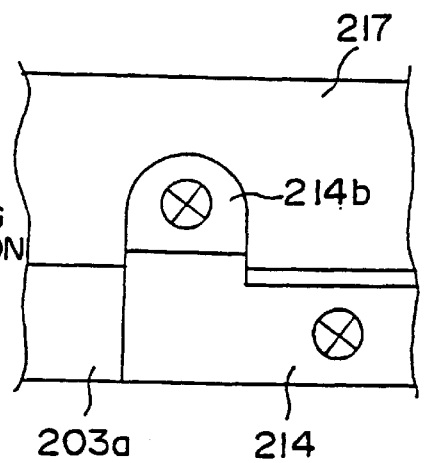

Further, as shown in FIGS. 25, 28A, 28B and 28C, the moving rail 217 of the other guide rail mechanism 216 is screwed on the pulling portions 214a and 214b of the guide rail pulling member 214 formed on the sub-chassis 203. Each of the pulling portions 214a and 214b was formed as being cranked as shown in FIG. 28A and thus acts as a leaf spring. The moving rail 217 was screwed on each of the pulling portions 214a and 214b so that the portion 214a and 214b were deformed. This deformation of the portions 214a and 214b was such that, due to resulting elastic restoration force of the pulling portions 214a and 214b acting as the leaf springs, the portions 214a and 214b always pull the moving rail 217 in a direction X shown in FIGS. 28A and 28B perpendicular to the directions A and B being sliding directions. This always pulling prevents the tray 202 from possibly disadvantageously moving in horizontal directions perpendicular to the directions A and B shown in FIG. 19. The static rail 218 of the guide rail mechanism 216 is screwed on a left side wall 210c of the chassis 210 shown in FIG. 25.

Figure 28B:
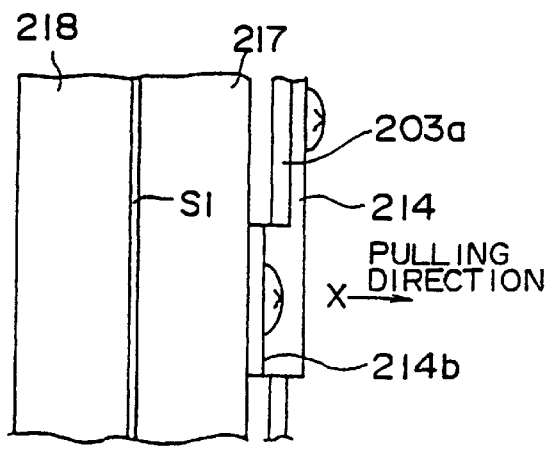

As shown in FIGS. 28A and 28B, when the moving rail 217 is pulled in the direction X, a first gap S1 is formed between the moving rail 217 and the static rail 218. Further, at the same time, a second gap S2 shown in FIG. 28A is formed between the static rail 218 and the second track 219b of the sliding rail 219. Further, at the same time, a third gap S3 shown in FIG. 28A is formed between the moving rail 217 and the first track 219a of the sliding rail 219. Due to the gaps S1, S2 and S3 thus-formed between the rails 217, 218 and 219 of the guide rail mechanism 216, sliding friction between the rails 217, 218 and 219 can be reduced. Thus, the guide rail mechanism 216 supports the tray 202 in a manner in which the tray 202 is slidable with the reduced sliding friction. And also the possible disadvantageous movement of the tray 202 in the horizontal directions perpendicular to the directions A and B shown in FIG. 19 can be prevented, even during the sliding of the tray 202, due to the pulling force in the direction X by means of the pulling portions 214a and 214b. Therefore, the tray 202 can move in the directions A and B easily and smoothly.

Further, the sliding rail 219 is provided between the static rail 218 and the moving rail 217 as described above with engagement between the pinion gear 220 and each of the rack gears 218b and 217b. The sliding rail 219 is slidable on each of the rails 217 and 218. As a result, the moving rail 217 can move in a direction of the directions A and B for a length twice a length for which the sliding rail 219 moves in the same direction. Therefore, the guide rail mechanisms 215 and 216 provide an appropriate length for which the tray 202 can move between the above-mentioned disc loading position and the disc replacement position. The guide rail mechanisms 215 and 216 guide the movement of the tray while the tray 202 moving for the above-mentioned appropriate length. Further, the possible disadvantageous movement of the tray 202 in the horizontal directions perpendicular to the directions A and B shown in FIG. 19 can be prevented, while the tray 202 moving for the above-mentioned appropriate length, due to the pulling force applied to the moving rail 217 in the direction X by means of the pulling portions 214a and 214b. Therefore, the tray 202 can be drawn in the direction A easily and smoothly.

Accordingly, the tray 202 moves with respect to the chassis 210 in the directions A and B stably. As a result, vibration transmitted from the tray 202 to the turn table 206 and the pick up unit 205 shown in FIG. 19 can be reduced. Thus, degradation of an accuracy in detecting information through the pick up unit 205 can be prevented, which information was recorded on the disc, the disc being rotated by the turn table 206.

Thus, the tray 202 is guided by the guide rail mechanisms 215 and 216 in a manner in which the tray 202 can slide in the directions A and B. As shown in FIG. 25, the left guide rail mechanism 216 is provided between of the left side of the sub-chassis 203 and the left side wall 210c of the chassis 210. The right guide rail mechanism 215 is provided between of the right side of the sub-chassis 203 and the right side wall 210d of the chassis 210. When the tray 202 is located in the disc loading position as shown in FIG. 18, the rails 217, 218 and 219 of the guide rail mechanisms 215 and 216 are contained in the chassis 210. When the tray 202 is dawn in the direction A and thus moves up to the disc replacement position as shown in FIG. 19, as shown in FIG. 27, the sliding rail 219 moves for a length L with respect to the static rail 218 in the direction A. At the same time, the moving rail 217 moves for the same length L in the direction A.

Further, as shown in FIGS. 19, 20, 25, and 29, a driving unit 221 is provided over the sub-chassis 203 and includes the pick up unit 205 and the turn table 206. The driving unit 221 further includes a base 222 mounted on the sub-chassis 203. The pick-up unit 205 and the turn table 206 are mounted on the base 222. The driving unit 221 further includes a pick up driving unit 223 for moving the pick up unit 205 along a pick up moving direction radially extending from a rotation axis of the disc placed on the turn table 206.

Further the tray 202 is mounted on the base 222 and the vibration absorbing members 255 is provided between the sub-chassis 203 and the base 222, the members 255 absorbing vibration. Vibration occurring in the sub-chassis 203 is absorbed by the vibration absorbing member 255. As a result, possible vibration occurring in the sub-chassis 203 when the tray 202 moves through the guide rail mechanisms 215 and 216 is absorbed by the vibration absorbing member 255. Thus, the possible vibration is reduced when the vibration has been transmitted to the pick up unit 205 and the turn table 206 via the vibration absorbing members 255 and the base 222.

Figure 29:
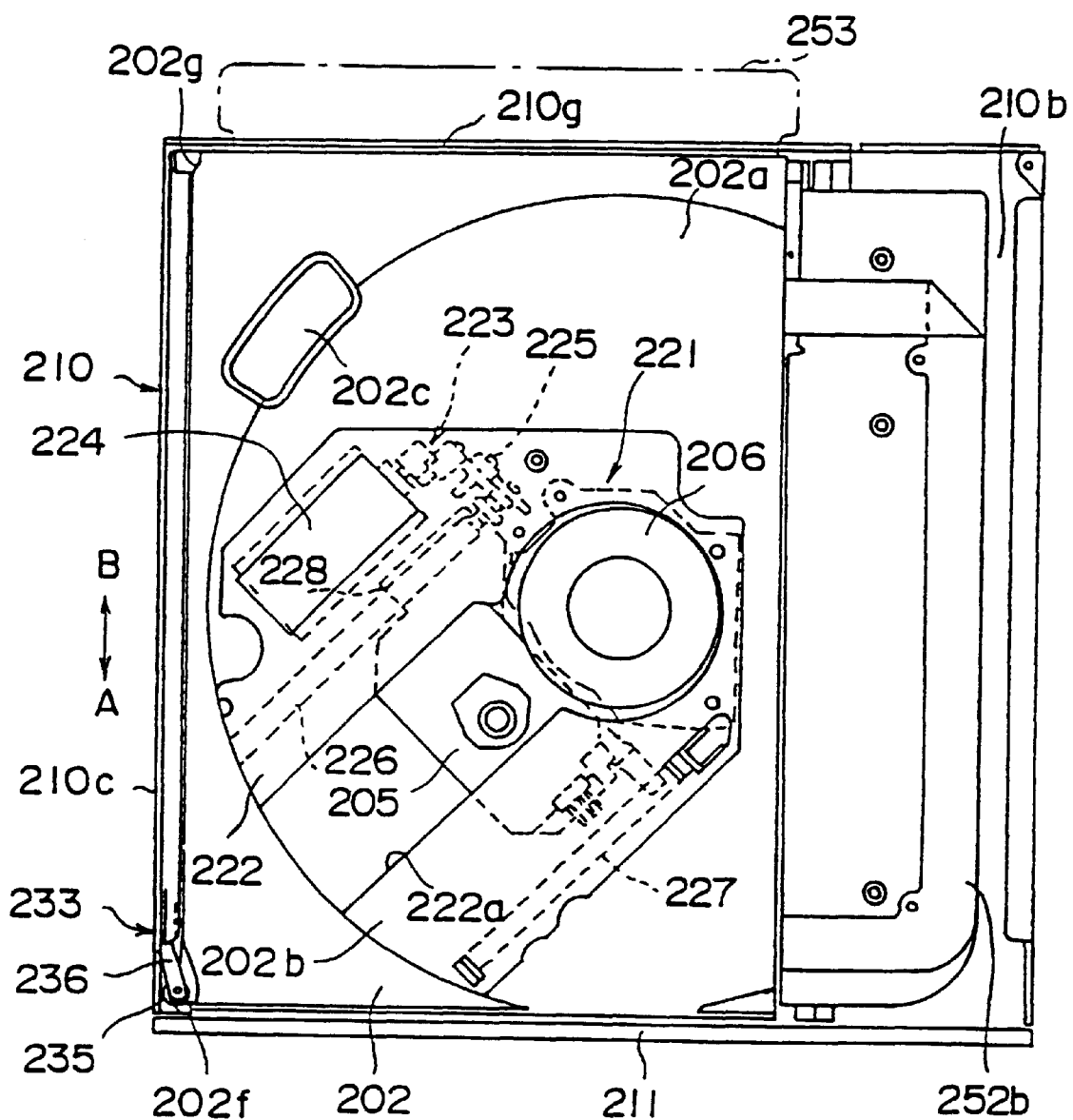
FIG. 29 shows a plan view of the CD-ROM drive device shown in FIG. 18 in a state in which a top plate has been removed.
Figure 30:
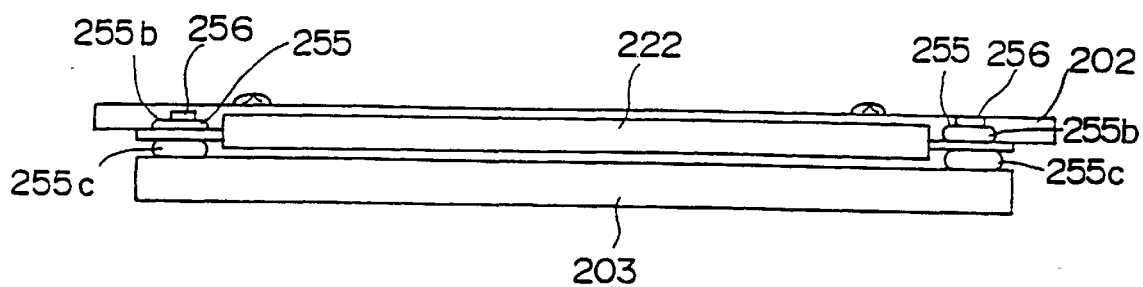
FIG. 30 shows a side elevational view of the CD-ROM drive device shown in FIG. 18 in a state in which a base and the tray are mounted on the sub-chassis.

As shown in FIG. 29, the pick up driving unit 223 includes a pick up driving motor 224 provided on a bottom surface of the base 222, a power transmission mechanism 225 including a plurality of gears, a lead screw 226 extending along the above-mentioned pick up moving direction and being turned via the power transmission mechanism 225, and a guide shaft 227 extending in parallel to the lead screw 226 and guiding the movement of the pick up unit 205. An opening 222a is formed in the base 222 so as to extend along the pick up moving direction. The pick up unit 205 is supported by the lead screw 226 and the guide shaft 227 at both sides of the pick up unit 205. The pick up unit 205 has an engaging portion 228 which engages with screw threads formed on the lead screw 226. Further, the guide shaft 227 supports the pick up unit 205 so that the pick up unit 205 is slidable on the guide shaft 227. Therefore, the pick up unit 205 moves along the pick up moving direction in response to the turning of the lead screw 226, the turning of the lead screw 226 resulting from the pick up driving motor 224 driving the lead screw via the power transmission mechanism 225. While the pick up unit 205 is thus moving along the pick up moving direction, the pick up unit 205 is exposed via the opening 222a extending along the pick up moving direction.

The turn table 206 has a turn table driving motor 229 at the bottom thereof. The turn table driving motor 229 starts turning when the tray 202 has reached the disc loading position in the device 201. Thus, the motor 229 rotates the disc which was previously clamped on the turn table 206 which thus is being rotated at a fixed rotation speed.

Figure 31A:
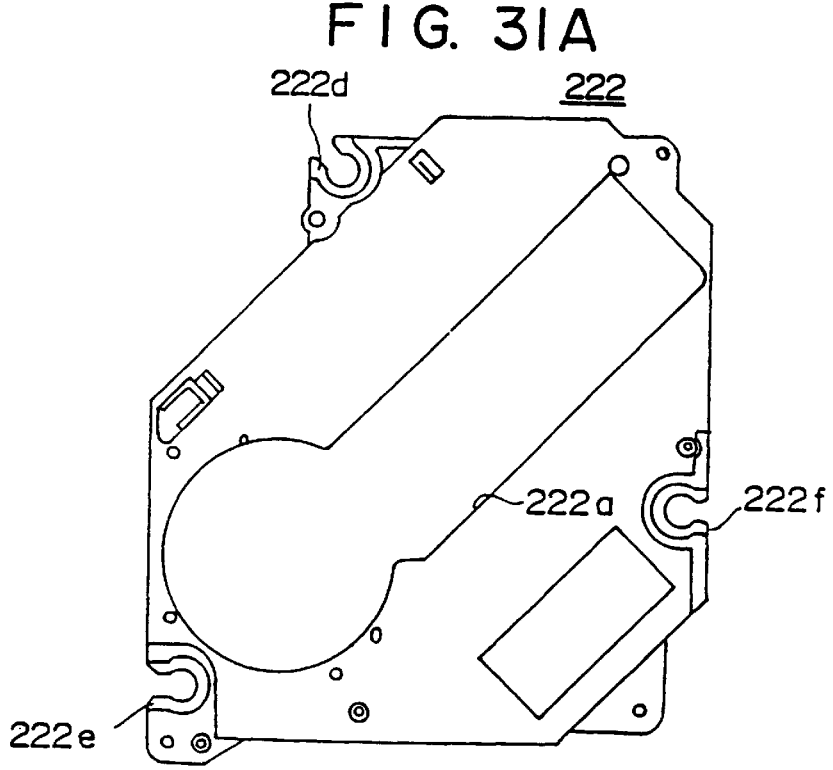
FIGS. 31A and 31B show a plan view and a front view of the base of the CD-ROM drive device shown in FIG. 18.
Figure 31B:
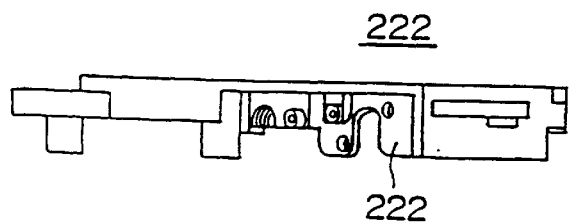
Figure 32A:
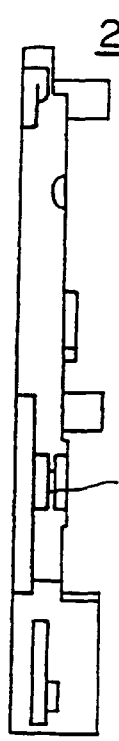
FIGS. 32A and 32B show a side elevational view and a bottom view of the base of the CD-ROM drive device shown in FIG. 18.

As shown in FIGS. 31A and 31B, the opening 222a formed in the base 222 has a shape not only such that the pick up unit 205 is exposed as described above but also such that the turn table 206 project therethrough. Further, as shown in FIGS. 32A and 32B, on the bottom surface of the base 222, there are provided a turn table mounting portion 222b on which the turn table 206 is mounted and a pick up driving unit mounting portion 222c on which the pick up driving unit 223 driving the pick up unit 205.

Figure 32B:
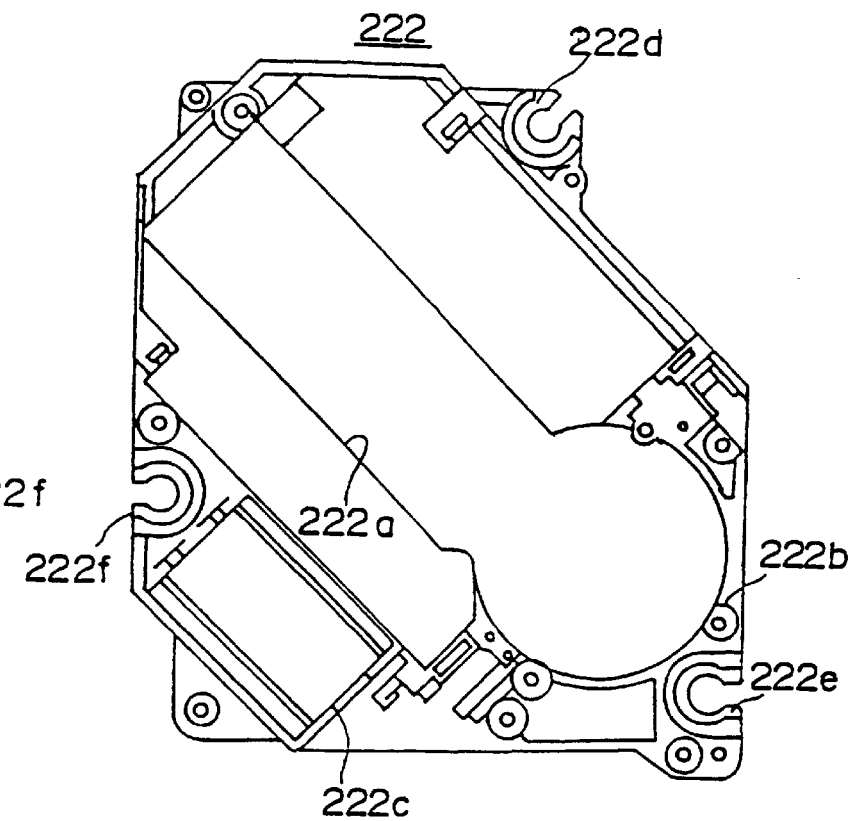

Further, the base 222 has three mounting portions 222d, 222e and 222f provided in the edge thereof as shown in FIG. 32B, these three mounting portions being used for mounting the base 222 on the sub-chassis 203. As shown in FIGS. 32A and 32B, each of the three mounting portions 222d, 222e and 222f has a letter "U" shape and is formed to be thinner than another portion surrounding the mounting portion so that the vibration absorbing members 255 can be inserted from the side and thus they can be installed to the mounting portions 222D, 222e and 222f.

Figure 33:
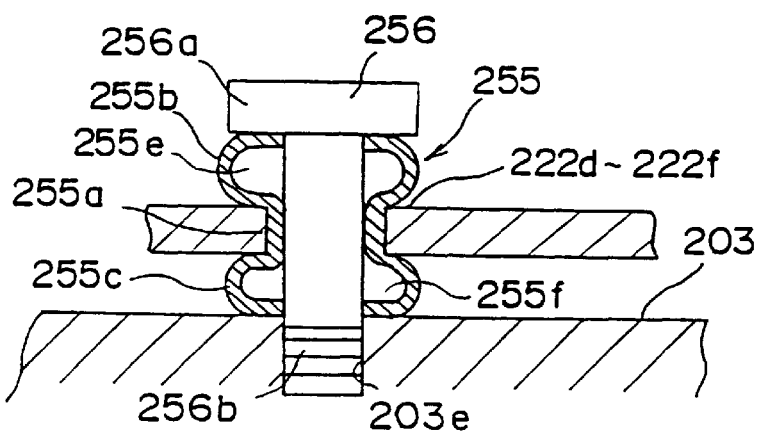
FIG. 33 shows a sectional side elevational view of a vibration absorbing member provided between the base and the sub-chassis of the CD-ROM drive device shown in FIG. 18.

Each of the vibration absorbing members 255 is made of one piece of elastic rubber, and, as shown in FIG. 33, has a neck portion 255a, a first damper 255b above the neck portion 255a and a second damper 255c below the neck portion 255a. The neck portion 255a has an outer diameter shorter than each of outer diameters of the first and second dampers 255b and 255c, as shown in the figure. Further, generally, each of the vibration absorbing members 255 has a hollow tube shape having a through hole 255d.

The top end and bottom end of each of the dampers 255b and 255c come into contact with the surface of a screw 256 over the entire circumference thereof as shown in FIG. 33, the screw 256 having been inserted into the through hole 255d. As a result, as shown in the figure, the dampers 255b and 255c form ring-shaped closed air spaces 255e and 255f between the inner surfaces of the dampers and the surface of the screw 256, respectively. Due to the provision of the closed air spaces 255e and 255f, each of the vibration absorbing members 255 forms an air spring.

The neck portions 255a of the vibration absorbing members 255 are fitted to the mounting portions 222d, 222e and 222f from the side. Then, a mail thread 256a of the screw 256 is inserted into the through hole 255d of each of the vibration absorbing members 255, and then is screwed in the above-mentioned screw hole 203e of the sub-chassis 203. Thus, the base 222 is fixed on the sub-chassis 203 via the vibration absorbing members 255.

As shown in FIG. 33, the screws 256 do not come into direct contact with the base 222 because the vibration absorbing members 255 are inserted between the base 222 and the screws 256. Therefore, vibration is prevented from being transmitted from the sub-chassis 203 to the base 222 via the screws 256. As shown in the figure, the head 256a of each screw 256 fastens a respective one of the mounting portions 222d, 222e and 222f of the base 222 to the sub-chassis 203 via the first damper 255b. Thus, the base 222 is flexibly supported on the sub-chassis 203 due to the vibration absorbing members 255. And thus, vibration occurring in the sub-chassis 203 in any possible direction can be absorbed by the vibration absorbing members 255. As a result, if vibration occurs in the sub-chassis 203 when the tray 202 moves in the directions A and B shown in FIGS. 18 and 19, the pick up unit 205 and turn table 206 mounted on the base 222 is prevented from being affected by the vibration. Thus, an accuracy in detecting data recorded in the disc through the pick up unit 205 is prevented from being degraded.

It is assumed that the disc is clamped on the turn table 206. The turn table 206 projects from the tray 202 as shown in FIG. 18 and thus the bottom surface of the disc clamped on the turn table 206 is spaced from the top surface of the tray 202. The turn table 206 on which the disc has been thus clamped is mounted on the base 222 as mentioned above and also the tray 202 is directly mounted on the base 222. As a result, the disc is constructively strongly related to the tray 202 via the turn table 206 and the base 222. If relatively large magnitude vibration occurs in the sub-chassis 203, the vibration absorbing members 255 is largely elastically deformed. Resulting vibration of the base 222 is unavoidable from occurring. Because the disc is constructively strongly related to the tray 202 via the turn table 206 and the base 222 as mentioned above, possible large elastic deformation of the vibration absorbing members 255 results in occurrence of corresponding vibration in the disc via the base 222 and the turn table 206 and also results in occurrence of the identical vibration in the tray 202 via the base 222. Because the disc and tray 202 vibrate identically as mentioned above, the disc is prevented from coming into contact with the tray 202. Thus, the disc is prevented from being damaged due to coming into contact with the tray 202.

Figure 34:
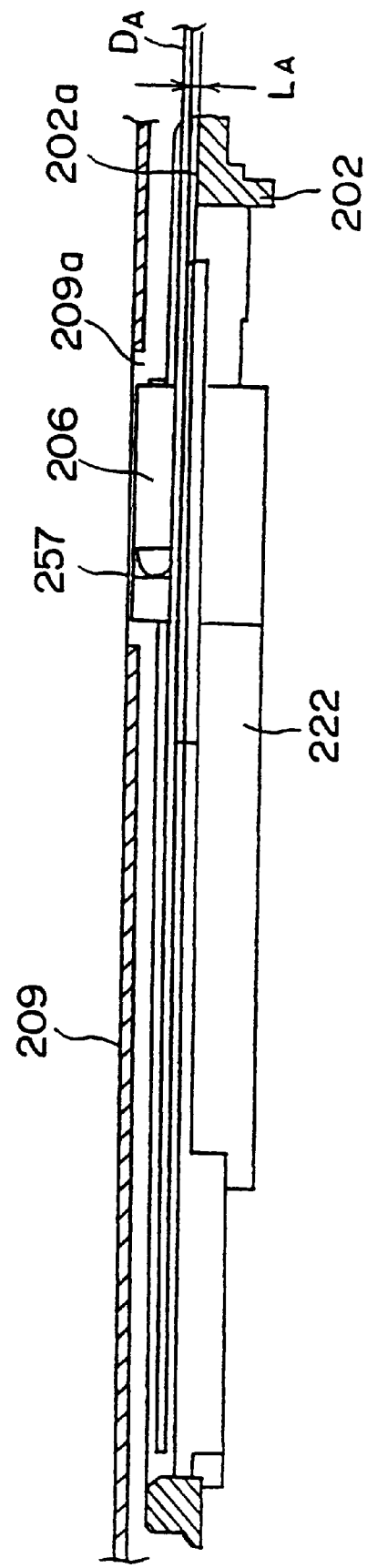
FIG. 34 shows a sectional elevational view of the CD-ROM drive device shown in FIG. 18, illustrating special relationship between the tray, a turn table, the top plate and a lid.

Conventionally, such a disc device has a structure such that a distance between the disc and tray may be approximately 5 mm in order to prevent the disc from coming into contact with the tray when the disc vibrates. In contrast to this, in the third embodiment of the present invention, as shown in FIG. 34, it is possible that a distance $L_A$ between the disc $D_A$ clamped on the turn table 206 and the disc facing portion 202a of the tray 202 is shortened to be approximately 1 mm. As a result, it is possible to make the disc device 201 be thinner.

Figure 35:
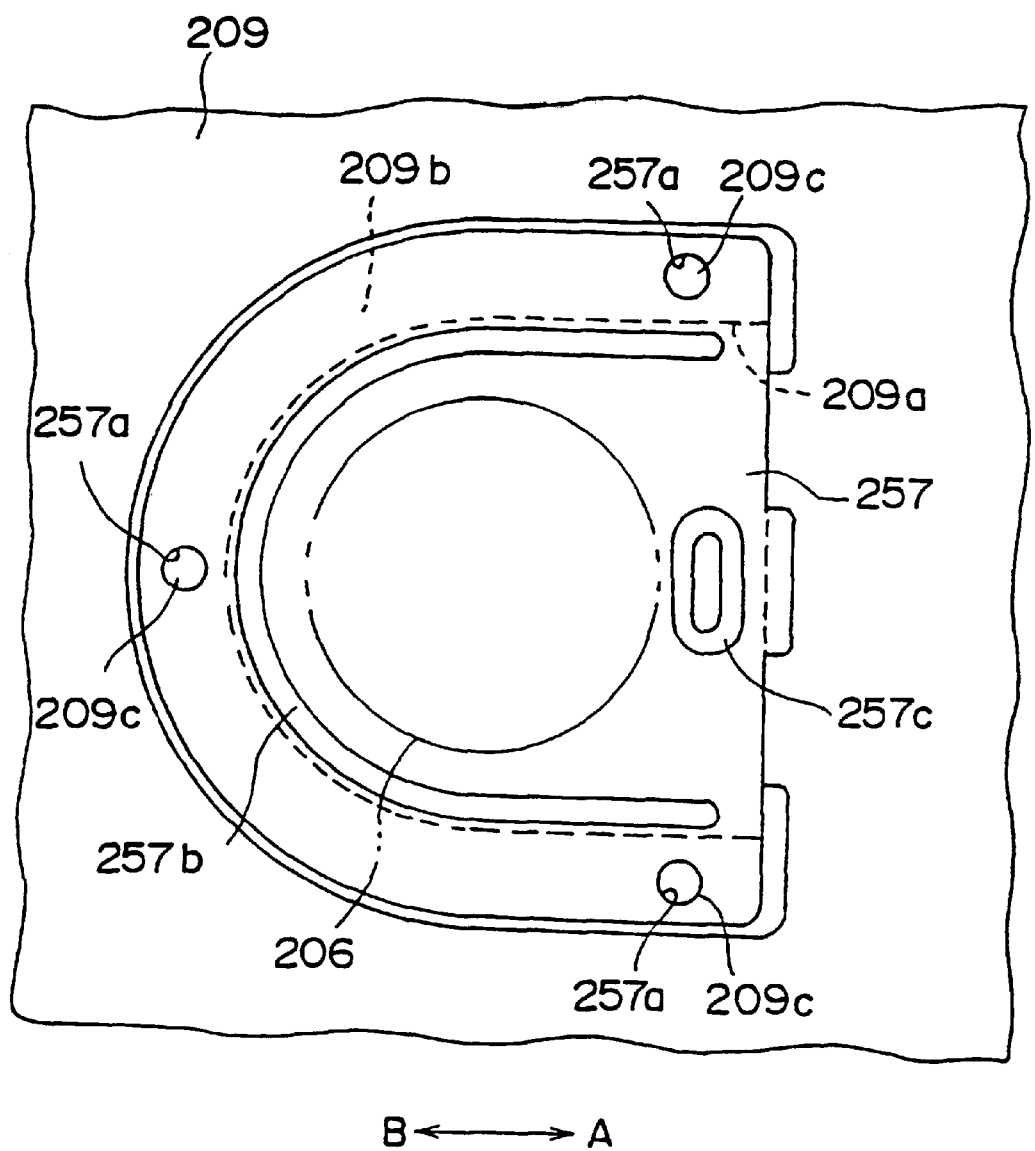
FIG. 35 shows a plan view of the lid closing an opening formed in the top plate of the CD-ROM drive device shown in FIG. 18.
Figure 36:
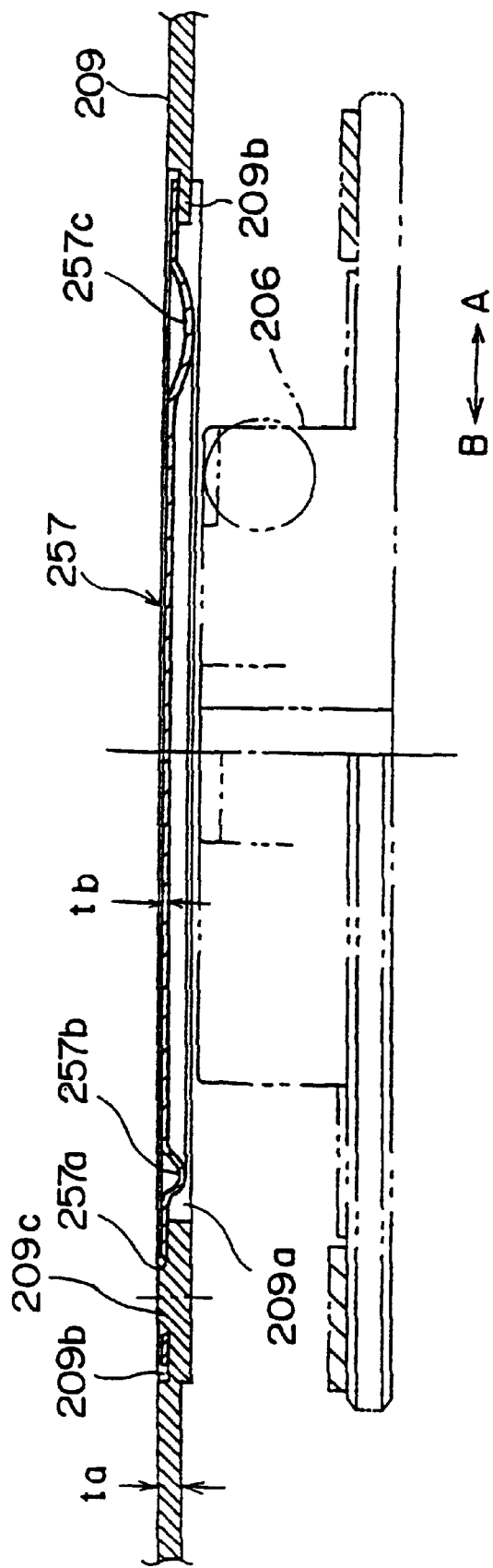
FIG. 36 shows a sectional side elevational view of the CD-ROM drive device shown in FIG. 18 illustrating a spatial relationship between the turn table, the top plate and the lid, in a state in which the tray is in a disc loading position.

A structure of the top plate 209 shown in FIG. 20 will now be described. As shown in FIGS. 34, 35 and 36, the top plate 209 has an opening 209a at a position which, when the tray 202 is located in the above-mentioned disc loading position, a top portion of the turn table 206 faces. The opening 209a is covered by a lid 257 having a thickness tb thinner than a thickness ta of approximately 1 mm of the top plate 209a. The thickness $t_b$ of the lid 257 is approximately 0.2 mm and thus approximately ⅕ of the thickness $t_a$ of the top plate 209a.

In the structure of the disc device 201, it is possible to position the top plate 209 as low as possible in which the lid 257 does not come into contact with the turn table 206. As a result, it is possible to make the disc device 201 be thinner.

When the tray 202 moves in the direction A, the top portion of the turn table 206 slides on the bottom surface of the top plate 209.

The edge of the lid 257 is placed on a mounting portion 209b provided around the opening 209a. The lid 257 has a shape similar to a shape of the opening 209a and has three holes 257a in the edge thereof. The mounting portion 209b has three bosses 209c which are shaped and positioned so as to match the three holes 257a of the lid 257 when the edge of the lid is placed on the mounting portion 209b. The bosses 209c are inserted into the holes 257a respectively and then the top of each of the bosses 209c is deformed. Thus, the edge of the lid 257 is fixed on the mounting portion 209a. The top surface of the mounting portion 209b is lower than the top surface of a portion around the mounting portion 209b in the top plate 209 as shown in FIG. 36. Thus, it is possible that the top surface of the lid 257 fixed on the top plate 209 is horizontally aligned with the top surface of the surrounding portion of the top plate 209.

Figure 37:
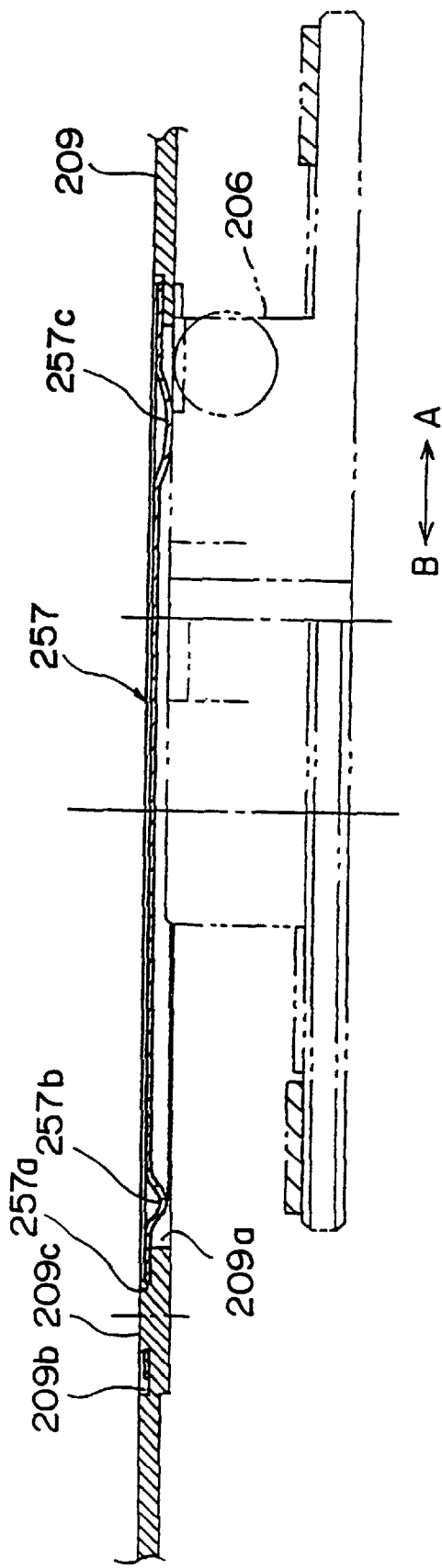
FIG. 37 shows a sectional side elevational view of the CD-ROM drive device shown in FIG. 18 illustrating a spatial relationship between the turn table, the top plate and the lid, in a state in which the tray is moving in a direction A from the disc loading position.

Further, in the lid 257, a letter "U"-shaped reinforcement rib 257b is formed and further a long circle-shaped protrusion 257c is formed, as shown in FIGS. 35 and 36. The top portion of the turn table 206 slides on the protrusion 257c and, as shown in FIG. 36, the protrusion 257c has a smoothly arc-shaped cross sectional shape. When the tray 202 moves in the direction A, the bottom surface of the protrusion 257c gradually presses the top portion of the turn table 206 downward and thus the turn table 206 is lowered as shown in FIG. 37.

The lowering of the turn table 206 is allowed as a result of the first and second dampers 255b and 255c of each of the vibration absorbing members 255 shown in FIG. 33 being deformed as the closed air spaces 255e and 255f are compressed vertically. As a result, the turn table 206 can smoothly slide on the top plate 209 when the tray 202 moves in the direction A. Because a portion at which the top plate 209 comes into contact with the top portion of the turn table 206 is limited on the protrusion 257c while sliding, friction between therebetween can be reduced.

Figure 38:
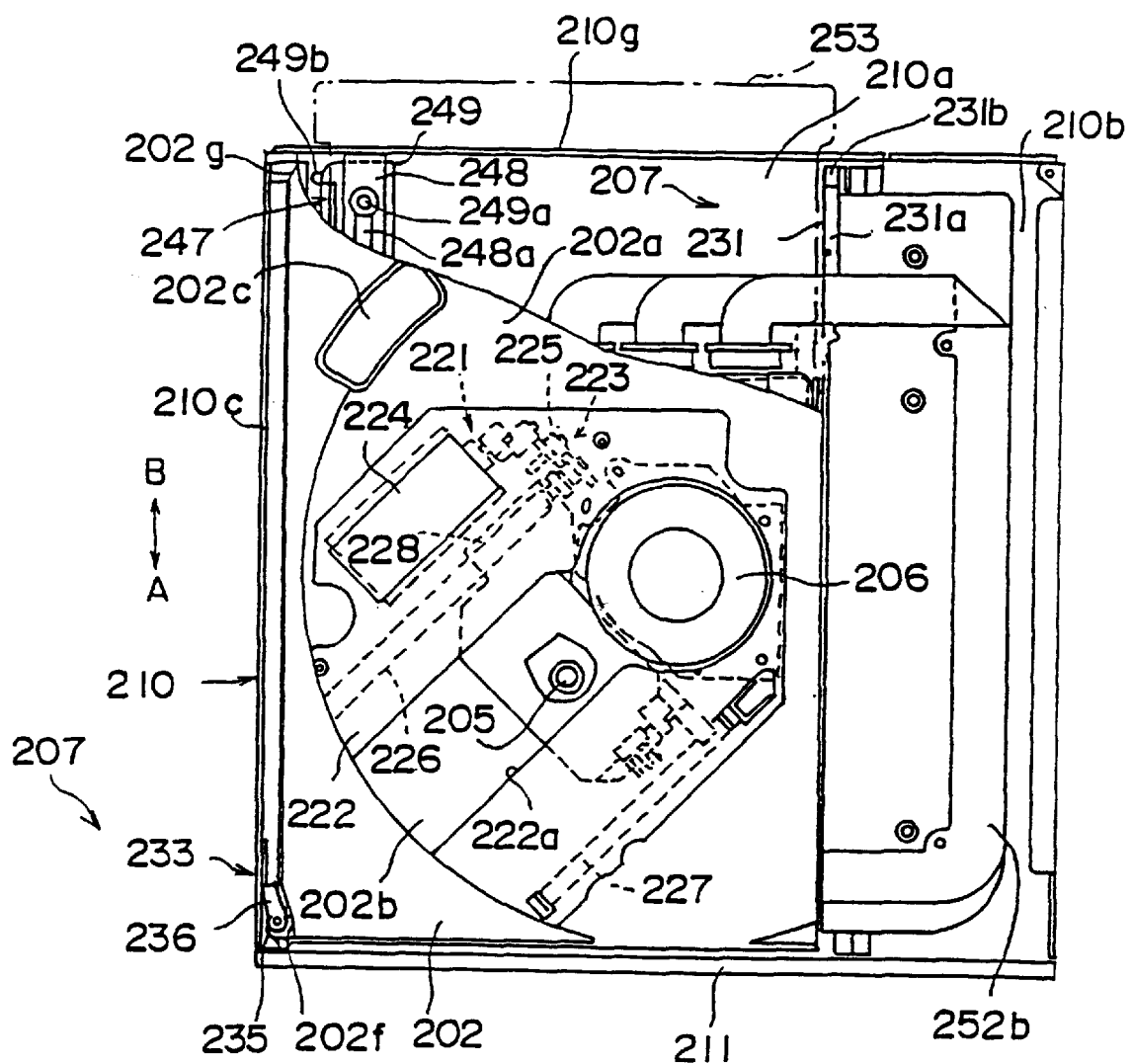
FIG. 38 shows a plan view of the CD-ROM drive device shown in FIG. 18 in which a part of the tray is eliminated from being shown.

As mentioned above, the holding mechanism 207 which the tray 202 when the tray 202 has moved to a disc replacement position. As shown in FIG. 38, the holding mechanism 207 includes a first holding member 231 located at the top right in FIG. 38 and a second holding member 233 located at the bottom left in the figure. As shown in FIG. 39B, The first holding member 231 engages with a holding hole 30 formed in the chassis 210 when the tray 202 has moved to the disc replacement position. Thus, the tray 202 is held there. As shown in FIG. 40C, the second holding member 233 engages with a cut-out portion 202g formed in the tray 202 when the tray 202 reaches the disc replacement position. Thus, the tray 202 is held there.

As shown in FIGS. 39A and 39B, the first holding member 31 is provided on a end portion of the bracket 203b of the sub-chassis 203. The first holding member 31 includes a leaf spring 231a fixed, with rivets 234, on the bottom surface of the end portion of the bracket 203b, and a holding portion 231b provided on the projecting end of the leaf spring 231a. The holding portion 231b has a sliding surface 231c for sliding on the chassis 210, a holding surface 231d for being held in a holding hole 230 of the chassis 210, and an inclined surface 231e used when the holding portion 231b is removed from the holding hole 230. As shown in FIG. 21, the holding hole 230 is located at a position near this end and near the right end of the containing portion 210a.

Before the tray 202 has reached the disc replacement position, as shown in FIG. 39A, the sliding surface3 231c of the holding portion 231b of the first holding member 231 slides on the chassis 210 and the leaf spring 231a is bent in a direction C. The bending of the leaf spring 231a causes the sliding surface 231c of the holding portion 231b to be pressed onto the chassis 210. This results in a reaction in which the sub-chassis 203 is pressed upward in FIG. 39A by the leaf spring 231a. Thus, the tray 202 mounted on the sub-chassis 203 is prevented from disadvantageously moving vertically in FIG. 39A. The holding portion 231b is made of synthetic resin and thus friction resistance due to the sliding of the holding portion 231b on the chassis 210 is relatively small. Thus, friction between the sliding surface 231c and the chassis 210 while sliding is reduced and the tray 202 may smoothly move in the direction A.

When the tray 202 reaches the disc replacement position, as shown in FIG. 39B, the holding portion 231b enters the holding hole 230 as the holding portion 231b moves in a direction D. Thus, the holding surface 231d comes into contact with the left edge, in FIG. 39B, of the hole 230. Due to the engagement of the holding surface 231d with the edge of the hole 230, the tray 202 on the sub-chassis 203 is prevented from being further moved in the direction A.

When the tray 202 moves in the direction B, the inclined surface 231e of the holding portion 231b runs on the right edge, in FIG. 39B, of the hole 230, as shown in the figure. Thus, the holding portion 231b moves in a direction C and thus the holding portion 231b is completely removed from the hole 230. As a result, the tray 202 can further move in the direction B as the holding portion 231b slides on the chassis 210 as shown in FIG. 39A.

Thus, the engagement of the holding portion 231b of the first holding member 31 with the holding hole 230 limits the movement of the tray 202 with respect to the chassis 210 in the direction A and allows the movement thereof in the direction B.

Figure 40A:
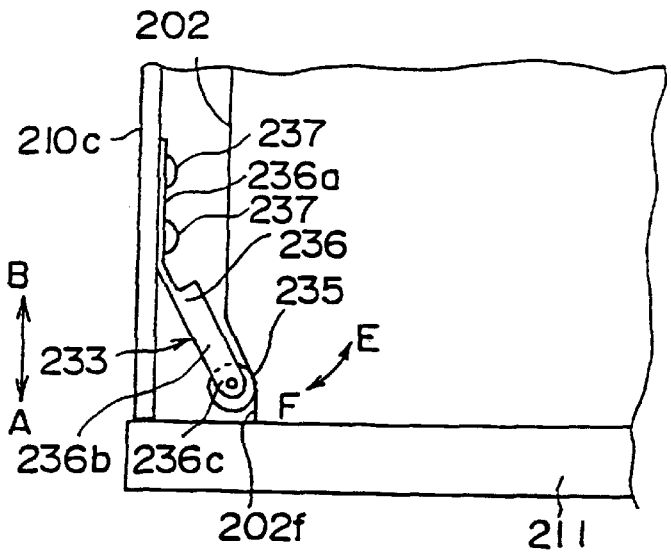
FIGS. 40A, 40B and 40C show magnified plan views of a second holding member.
Figure 40B:
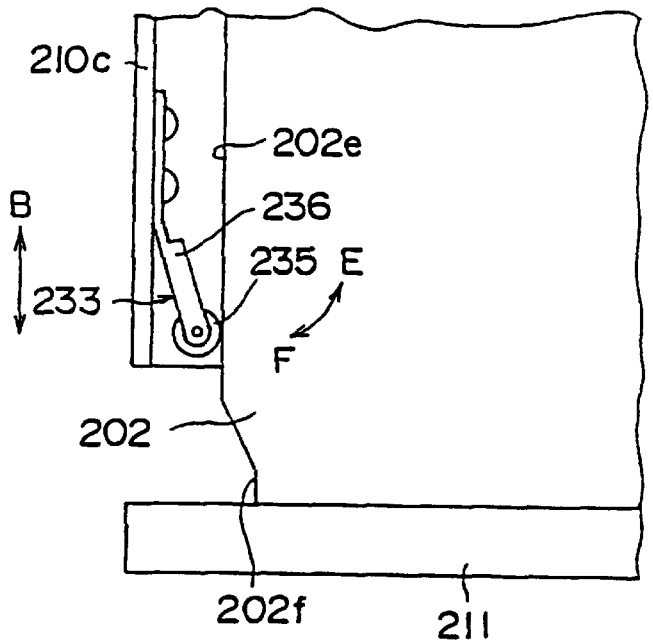
Figure 40C:
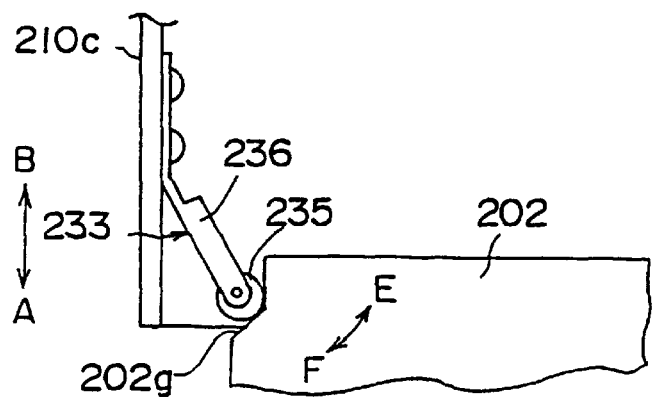

As shown in FIGS. 40A, 40B and 40C, the second holding member 233 includes a roller 235 for rolling on a side wall 202e of the tray 202, and a roller supporting member 236 for supporting the roller 235 in a manner in which the roller is rotatable. The roller 235 rolls on the side wall 202e of the tray 202 as the tray 202 moves in the directions A and B. The roller 235 enters the cut-out portion 202g formed in the side wall 202e when the tray 202 reaches the disc replacement position, and the roller 235 enters a cutout portion. 202f also formed in the side wall 202e. As a result of the roller 235 entering the cut-out portions 202g as shown in FIG. 40C, the movement of the tray 202 in the direction A is restricted. As a result of the roller 235 entering either of the cut-out portions 202g and 202f, the movement of the tray 202 in the direction B is restricted. As shown in FIG. 22A, the cut-out portion 202f is located at this side and the left side of the tray 202, and the cut-out portion 202g is located at the other side and the left side thereof.

As shown in FIG. 40A, one end 236a of the roller supporting member 236 is fixed on the this side of a left side wall 210d of the chassis 210 with rivets 237. An arm portion 236b extends from the end 236a and the extending end 236c has the roller 235 supported thereon. The arm portion 236b acts as a leaf spring for causing the roller 235 to press side wall 202e of the tray 202 in a direction E. Thus, the tray 202 is prevented from disadvantageously moving horizontally in FIG. 40B. When the tray 202 reaches the disc loading position, as shown in FIG. 40A, the roller 235 enters the cut-out portion 202f because the leaf spring function of the arm portion 236b moves the roller 235 in the direction E. Thus, the movement of the tray 202 in the direction A is restricted. Similarly, when the tray 202 reaches the disc replacement position, as shown in FIG. 40C, the roller 235 enters the cut-out portion 202g because the leaf spring function of the arm portion 236b moves the roller 235 in the direction E. Thus, the movement of the tray 202 in the direction B is restricted. If an operator applies a force to the tray 202, which force may overcome the elastic force of the leaf spring function of the arm portion 236b, it is possible to move the tray 202 either in the direction A from the disc loading position or in the direction B from the disc replacement position. In fact, the operator's force bends the arm portion 236b in a direction F and thus causes the roller 235 to run on an edge of either of the cut-out portions 202g and 202f. Thus, the roller 235 is removed from either of the cut-out portions 202f and 202g and thus the tray 202 then may smoothly move as the roller 235 rolls on the side wall 202e of the tray 202 as shown in FIG. 40B.

Figure 24:
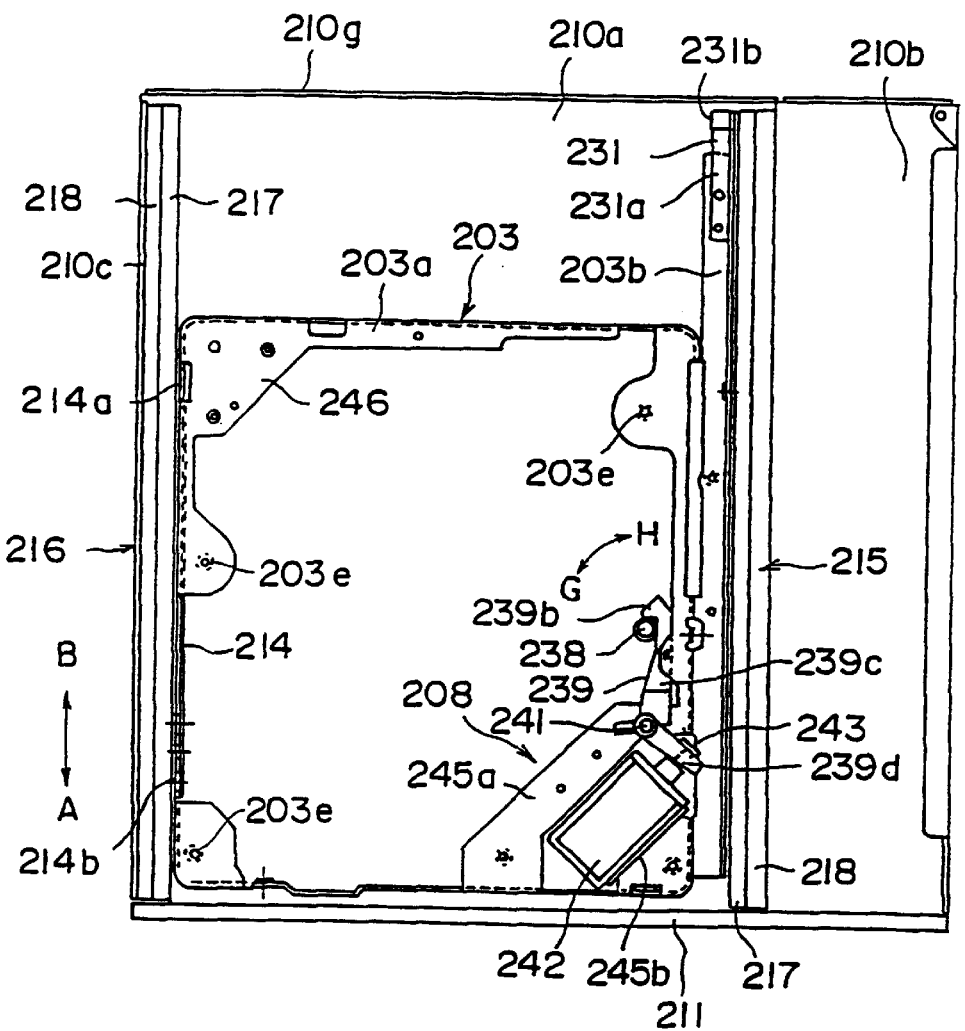
FIG. 24 shows a plan view of the CD-ROM drive device shown in FIG. 18 in which two sides of the sub-chassis are supported by two guide rail mechanisms respectively.
Figure 41:
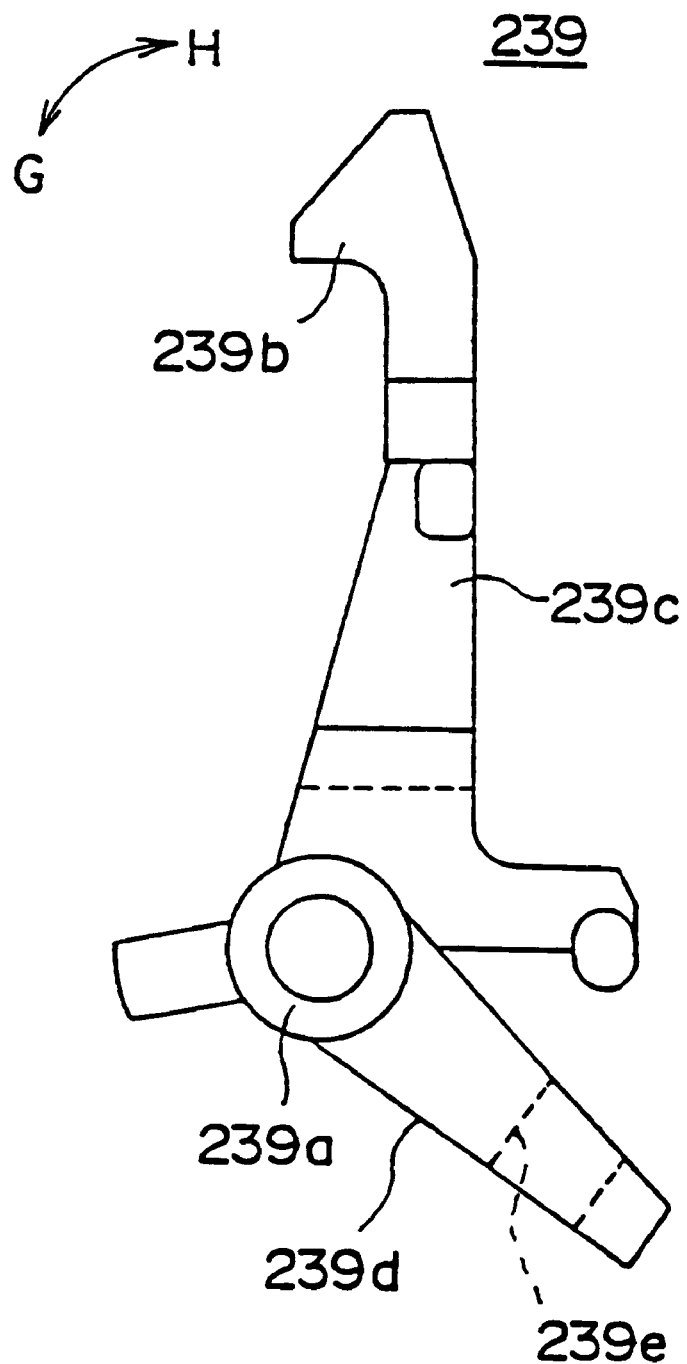
FIG. 41 shows a magnified plan view of a locking lever in the CD-ROM drive device shown in FIG. 18.

As shown in FIG. 24, the above-mentioned locking mechanism 208 is located at a corner of the sub-chassis 203, the corner being located at the bottom right in FIG. 24 of the sub-chassis 203. The locking mechanism 208 includes a locking lever 239, which is mounted on a mounting portion 245a of the frame 203a of the sub-chassis 203 and is held by a holding roller 238 provided on a bottom portion 210f of the chassis 210. The locking mechanism 208 further includes a solenoid 242 which is mounted on a mounting portion 245b of the frame 203a of the sub-chassis 203 and drives the locking lever 239 to rotate between a locking position and a locking releasing position. As shown in FIG. 41, the locking lever 239 includes a bearing portion 239a fitted to a shaft 241 standing on the frame 203a, an arm 239c having a nail portion 239b at a free end thereof, which portion 239b engages with the holding roller 238, and a linking arm 239d linked with a plunger 243, which plunger is driven by the solenoid 242. An projecting end of the plunger 243 passes through a hole 239e formed in the linking arm 239d as shown in FIG. 41 and thus is linked with the locking lever 239.

The locking lever 239 has a torsion spring (not shown in the figures) which applies a force to the locking lever 239 and thus the lever 239 moves in a direction G shown in FIG. 41. As a result, the nail portion 239b of the lever 239 engages with the holding roller 238 and thus the locking lever 239 locks the sub-chassis 203 to the chassis 210. Then, if the above-mentioned switch button 212 of the front bezel 211 is manipulated in an ON manner, the solenoid 242 is energized and thus absorbs the plunger 243. When the solenoid 242 is energized as mentioned above, the plunger 243 pulls the linking arm 239d as a result of moving due to electromagnetic force of the solenoid 242. As a result, the lever 239 is rotated in a direction H about the shaft 241 and thus the nail portion 239b is disengaged from the holding roller 238. Thus, the lever 239 release the locking of the sub-chassis 203 with the chassis 210.

Figure 42:
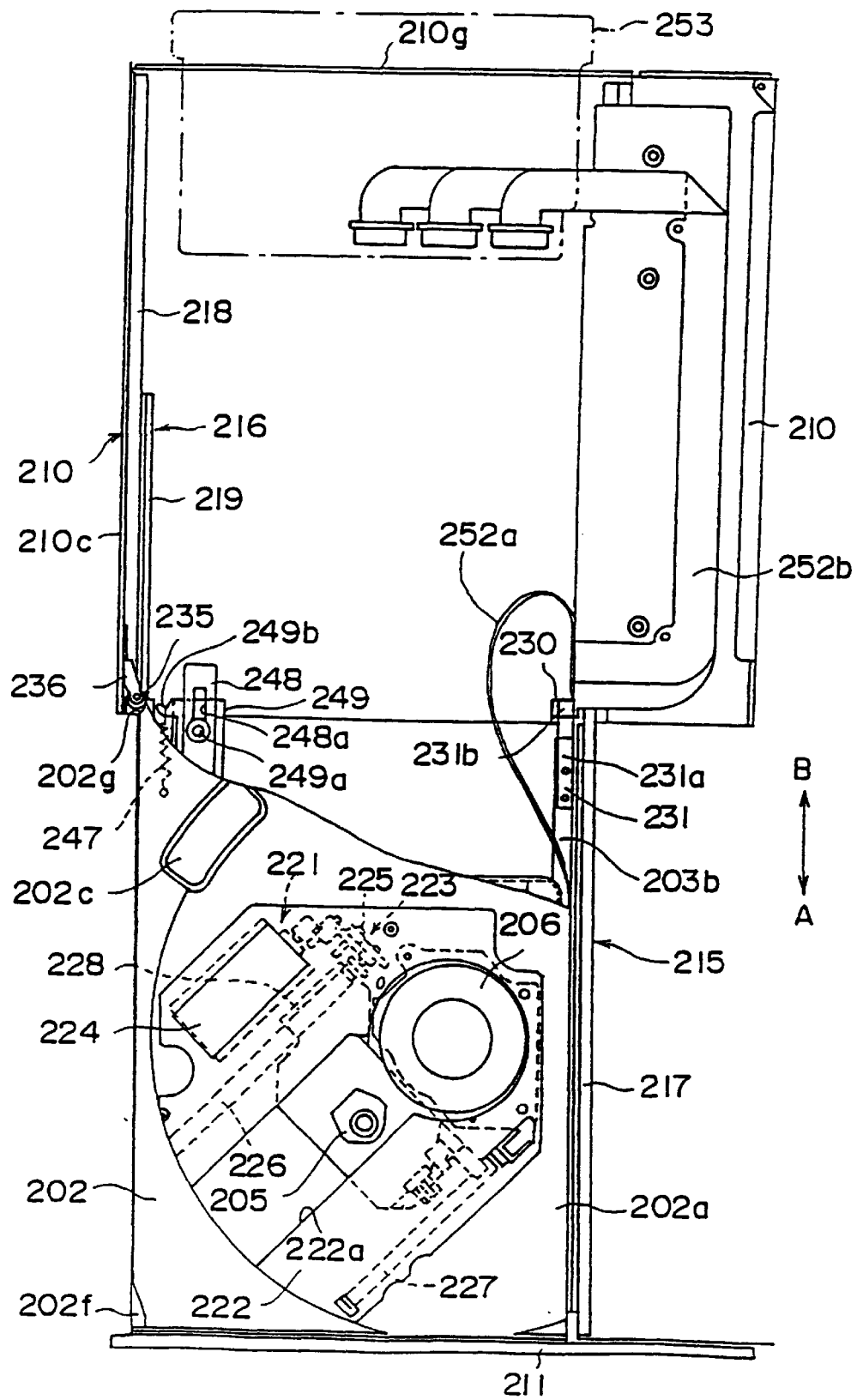
FIG. 42 shows a plan view of the CD-ROM drive device shown in FIG. 18 in which a part of the tray is eliminated from being shown, in a state in which the tray is in a disc replacement position.

The above-mentioned extending member 249 is mounted on the mounting portion 246 of the frame 203a of the sub-chassis 203a, the portion 246 being located at the top left in FIG. 23A of the sub-chassis 203. As shown in FIG. 42, the above-mentioned ejecting pushing member 248 has a long hole 248a formed therein, and a pin 249a stands on the extending member 249. The pin 249a of the extending member 249 is inserted into the long hole 248a of the ejecting pushing member 248. Further, a spring 247 is provided, one end thereof is held to a holding portion 249b formed at the top left, in FIG. 42, of the extending member 249, and the other end is held by a bottom left portion (not shown in the figure) of the ejecting pushing member 248. As a result, elasticity of the spring 247 applies a pulling force to the ejecting pushing member 248 to cause the ejecting pushing member to move in the direction B.

When the tray 202 is located in the disc loading position as shown in FIG. 38, the ejecting pushing member 248 is pressed onto a rear wall 210g of the chassis 210. Thus, as shown in FIG. 38, the ejecting pushing member 248 moves in the direction B with respect to the extending member 249 mounted on the sub-chassis 203, and thus the elasticity of the spring 247 causes the ejecting pushing member 248 to push the rear wall 210g of the chassis 210. Therefore, when the locking of the sub-chassis 203 with the chassis 210 is released as mentioned above, the pushing force of the ejecting pushing member 248 to the rear wall 210g of the chassis 210 results in a reaction in which the sub-chassis 203 moves in the direction A.

Accordingly, the tray 209 mounted on the sub-chassis 203 moves in the direction A and thus the front bezel 211 projects from the front surface of the notebook type personal computer, not shown in the figures, in which the disc device 201 is incorporated. Thus, the operator can easily pull the front bezel 211 and thus draw the tray 202. As a result of the operator pulling the front bezel 211 and thus drawing the tray 202 in the direction A by the operator's hand, the tray 202 reaches the disc replacement position as shown in FIG. 19.

A circuit substrate 251 shown in FIG. 21 is mounted on the bottom surface of the tray 202 and drives and controls each portion of the above-described driving unit 221. The circuit substrate 251 is connected to the pick up unit 205, the turn table 206, and the pick up driving motor 224 of the driving unit 221, and is connected to, via flexible cable 252a and 252b shown in FIGS. 19 and 42, to an externally connecting substrate 253. The circuit substrate 251 provides control signals to the pick up unit 205, the turn table 206, and the pick up driving motor 224 of the driving unit 221, which thus perform predetermined operations. The flexible cable 252a is located between the sub-chassis 203 and a right side wall of the containing portion 210a of the chassis 210 where the flexible cable 252a is slackened to be letter "U"-shaped. Thus, the flexible cable 252a does not prevent the tray 202 from smoothly moving with respect to the chassis 210.

Performance of the above-described CD-ROM drive device 201 will now be described.

When the tray 202 is contained in the device 201 as shown in FIGS. 18, 29, and 38, as shown in FIG. 24, the locking lever 239 mounted on the sub-chassis 203 is held by the holding roller 238 of the chassis 210. Thus, the locking mechanism 208 locks the tray 202 and the sub-chassis 203 in the disc loading position in the device 201. Further, as shown in FIG. 40A, the roller 235 of the holding member 233 is fitted into the cut-out portion 202f of the tray 202 so that the tray 202 resists moving in the direction A.

In response to the switch button 212 of the front bezel 211 being manipulated in the ON manner, with reference to FIG. 24, the electromagnetic force of the solenoid 242 pulls the plunger 243 to the inside of the solenoid 242. As a result, the locking lever 239 is rotated in the direction H about the shaft 241 and thus the nail portion 239b disengages from the holding roller 238. Thus, the locking of the tray 202 with the sub-chassis 210 in the disc loading position is released. As a result, with reference to FIG. 38, the elasticity of the coil spring 247 causing the ejecting pushing member 248 to push the rear wall 210g of the chassis 210 results in the reaction of the sub-chassis 203 together with the tray 202 moving the direction A.

With reference to FIGS. 40A and 40B, the roller 235 of the holding member 233, which has been fitted into the cut-out portion 202f of the tray 202 as show in FIG. 40A, rolls on an inclined portion of the cut-out portion 202f, as the ejecting pushing member 248 pushes the rear wall 210g of the chassis 210 and thus the sub-chassis 203 together with the tray 202 moves in the direction A. As a result, the roller 235 rolls the side wall 202e of the tray 202 as shown in FIG. 40B. Thus, the sub-chassis 202 and tray 203 automatically move in the direction A and thus the front bezel 211 projects from the front surface of the notebook type personal computer for a predetermined distance. Therefore, the operator can easily handle and pull the front bezel 211. As the front bezel 211 is pulled by the hand of the operator in the direction A, the moving rail 217 of each of the above-described pair of guide rail mechanisms 215 and 216 slides on the sliding rail 219 in the direction A and simultaneously the sliding rail 219 slides in the static rail 218 in the direction B, with reference to FIG. 27.

With reference to FIG. 37, while the tray 202 thus moves in the direction A, the top portion of the turn table 206 is pressed down as the top portion slides on the gentle slope of the projection 257c. At the same time, the first and second dampers 255b and 255c of the vibration absorbing members 255 shown in FIG. 33 are vertically compressed as the turn table 206 is thus pressed down. Thus, the turn table 206 smoothly slide on the bottom surface of the top plate 209.

Thus, when the front bezel 211 is further pulled in the direction A, the sub-chassis 203 and the tray 202 move as the pair of the guide rail mechanisms 215 and 216 guide the movement of the tray and sub-chassis. During the movement in the direction A, the roller 235 of the holding member 233 is continuously pressed onto the side wall 202e of the tray 202. Thus, a possible disadvantageous movement of the tray in horizontal directions perpendicular to the direction A is prevented and thus the tray can move stably. Further, the above-described guide rail pulling member 214 continuously pulls the moving rail 217 in the direction X shown in FIG. 28A. Thus, a possible disadvantageous movement of the tray in the horizontal directions perpendicular to the direction A is prevented and thus the tray can move stably.

When the tray 202 reaches the disc replacement position as shown in FIGS. 19 and 42, the roller 235 of the holding member 233 is fitted into the cut-out portion 202g of the tray 202 shown in FIG. 40C. This being fitted of the roller 235 into the cut-out portion 202g is accompanied with a click like feeling which may perceived by an operator who has moved the tray 202 until this time. Simultaneously, as shown in FIG. 39B, the holding portion 231b of the holding member 231 is fitted into the holding hole 230 as moving in the direction D, and thus the holding surface 231d comes into contact with the vertical edge wall of the holding hole 230. Thus, the tray 202 is locked in the disc replacement position and thus further movement of the tray 202 in the direction A is prevented. Thus, the being fitted of the roller 235 of the holding member 233 into the cut-out portion 202g of the tray 202 provides the click like feeling to the operator, who has been pulling the front bezel 211 in the direction A, when the tray 202 is locked. Therefore the operator can effectively recognize the locking and thus the operator is prevented from further pulling the front bezel 211. As a result, the tray 202 is prevented from being further pulled so as to be completely removed from the chassis 210. Further, it is also prevented that the operator may stop pulling the front bezel 211 even before the tray 202 has not reached the disc replacement position yet.

After the tray 202 has been locked in the disc replacement position as mentioned above, if a disc has been placed on the turn table 202, the operator may remove the disc from the turn table 206. The tray 202 has a structure such that the disc $D_A$ has been placed on the turn table 206 in a state in which the right part of the disc $D_A$ extends from the right edge of the tray 202 as shown in FIG. 22A. Therefore, the operator can hold the disc $D_A$ by the operator's hand from any direction and can hold any portion of the disc. Thus, it is easy for the operator to surely take the disc out from the tray 202.

After that, the operator may put a new disc on the turn table 206 and then may push the front bezel 211 in the direction B. By this pushing, the roller 235 of the holding member 233 rolls on the inclined edge of the cut-out portion 202g shown in FIG. 40C. As a result, the roller 235 rolls on the side wall 202e as shown in FIG. 40B. Simultaneously, the inclined surface 231e of the holding portion 231b of the holding member 231 slides on the edge (located at the right side in FIG. 39B) of the holding hole 230 and thus moves in the direction C shown in FIG. 39B. Thus, the locking of the tray 202 in the disc replacement position is released.

After that, as the operator further pushes the front bezel 211 in the direction B, the tray 202 moves in the direction B as being guided through the pair of guide rail mechanisms 215 and 216. As a result, the tray 202 reaches the disc loading position shown in FIGS. 18, 29, and 38. Same as the tray 202 moves in the direction A as described above, while the roller 235 of the holding member 233 rolls on the side wall 202e of the tray 202, the roller 235 continuously presses the tray 202. Thus, a possible disadvantageous movement of the tray in the horizontal directions perpendicular to the direction B is prevented and thus the tray can move smoothly and stably.

When the tray 202 reaches the disc loading position, the roller 235 of the holding member 233 is fitted into the cut-out portion 202f of the tray 202, as shown in FIG. 40A, with a click like feeling being perceived by the operator who has been pushing the front bezel 211. Simultaneously, as shown in FIG. 24, the locking lever 239 of the locking mechanism 208 is held by the holding roller 238 of the chassis 210. Due the click like feeling perceived when the roller 235 is fitted into the cut-out portion 202f, the operator may easily recognize, via the operator's finger feeling, that the tray 202 has reached the disc loading position.

Application of the present invention is not limited to a CD-ROM drive device such as that described above. The present invention may be similarly applied to any device which handles disc (disk)-shaped recording media such as CDs, magnetic disks, magneto-optical discs, optical discs.

Further, application of the present invention is not limited to a device which is incorporated into a notebook type personal computer such as that described above. The present invention may be applied to any device which is incorporated into not only another electronic apparatus but also another apparatus other than electronic apparatuses.

Further, application of the present invention is not limited to a device in which the tray is moved by an operator's hand. The present invention may be applied to any device in which the tray is driven by driving means such as an electric motor.

Further, application of the present invention is not limited to a device in which the disc is placed on the tray. The present invention may be applied to any device in which the disc is directly placed on the tray.

Thus, according to the above-described third embodiment of the present invention, the tray is fixed on the base, and the vibration absorbing members are provided between the sub-chassis and the base. The vibration absorbing members elastically supports the base and tray and thus absorb undesirable vibrations. Thus, not only the tray supporting the turn table and pick up device but also the base are elastically supported. Therefore, the disc clamped onto the turn table is prevented from disadvantageously coming into contact with the tray. As a result, it is possible to have a structure in which a distance between the disc clamped onto the turn table and the tray is reduced. Thus, the disc device can be thinner.

Further, the tray has a structure such that the part of the disc extends from the edge of the tray. Thus, an operator can easily hold the extending part of the disc and thus easily and surely take the disc out from the tray. Further, such a structure of the tray enables the chassis to be miniaturized and thus the disc device to be miniaturized.

Further, the present invention is not limited to the above-described embodiments, and variations and modifications may be made without departing from the scope of the present invention.

What is claimed is:

1. A disc device comprising:
   a chassis;
   a movable tray part having a disc supporting means including a turntable for supporting a disc oil on a plane,
   a motor for rotating the disk and pickup means for recording and/or reproducing a signal from the disk, said tray part being slidably provided with respect to said chassis between a first position inside said chassis and a second position which exposes said disc supporting means outside said chassis,
   wherein a width of said movable tray part in a direction parallel to said plane and perpendicular to the direction of movement of the tray part is smaller than a maximum diameter of the disc and
   wherein a shape of said chassis is such that said chassis covers the bottom surface of a portion of the disc placed on the turntable, which portion extends outwardly beyond the outer periphery of said tray part, and a space is formed below a portion of said chassis, which portion covers said bottom surface of said portion of said disc and extends immediately underneath just said portion of said disc and not said tray part.

2. The disc device as claimed in claim 1, wherein said tray part further comprises:
   a tray;
   a sub-frame mounted with said tray and said turntable and movable between said first and second positions.

3. The disc device as claimed in claim 2, further comprising:
   guiding means, located on opposite sides of said sub-frame, for guiding said sub-frame between said first position and said second position,
   wherein, when the disc is supported by said turntable, a part of said disc which overhangs from said tray also overhangs from said guiding means.

4. The disc device as claimed in claim 3, wherein said guiding means comprises rails.

5. The disc device as claimed in claim 2, further comprising:
   a disc motor which is connected to and rotates said turntable.

6. The disc device as claimed in claim 5, wherein said disc motor is mounted on said sub-frame.

7. The disc device as claimed in claim 2, wherein said tray has an opening, and said pickup records the signal on the disc and/or reproduces the signal from the disc via the opening of said tray.

8. The disc device as claimed in claim 2, wherein said pickup is mounted on said sub-frame.

9. A disc device into which a CD may be removably inserted having a chassis adapted to be integrated into the frame of a computer and a movable tray comprising:

a turntable supported on said tray for guiding an operator's placement of a disc on said turntable, a pickup unit including an optical head for detecting information recorded in said disk;

a base for supporting said turntable and said pickup unit;

wherein said tray is movable between a disc loading position inside said chassis and a disc replacement position which exposes said turntable outside said chassis; and said tray having a structure such that a part of said disc, which is placed on said turntable, extends outwardly beyond the outer periphery of said tray to permit said part of said disc to overhang from said tray with said disc device further comprising:

said chassis having a sub-frame for supporting said base with the sub-frame arranged so as to be able to project from said device and retreat to said device and with said tray being mounted on said sub-frame; and rail means located on opposite sides of said sub-frame for moving said sub-frame between said disc loading position and said disc replacement position wherein the part of the disc which overhangs from said tray also overhangs from said rail means when in the disc replacement position thereby permitting said disc device to be miniaturized in size.

10. The disc device as claimed in claim 9, further comprising:

a disc motor which is connected to and rotates said turntable, and wherein said tray and said disc motor also move between said disc loading position and said disc replacement position integrally with said sub-frame.

11. The disc device as claimed in claim 10, wherein said disc motor is mounted on said sub-frame.

12. The disc device as claimed in claim 9, further comprising a pickup recording a signal to said disc and/or reproducing a signal from said disc, and wherein said pickup can move between said disc loading position and said disc replacement position integrally with said tray.

13. The disc device as claimed in claim 12, wherein said tray has an opening, and said pickup records the signal on said disc and/or reproduces the signal from the disc via the opening of said tray.

14. The disc device as claimed in claim 12, wherein said pickup is mounted on said sub-frame.

* * * * *

UNITED STATES PATENT AND TRADEMARK OFFICE
CERTIFICATE OF CORRECTION

PATENT NO. : 6,151,285
DATED : November 21, 2000
INVENTOR(S) : Watanabe et al.

It is certified that error appears in the above-identified patent and that said Letters Patent is hereby corrected as shown below:

Column 32,
Line 24, should read -- including a turntable for supporting a disc on a --

Signed and Sealed this

Eighteenth Day of December, 2001

Attest:

Attesting Officer

JAMES E. ROGAN
Director of the United States Patent and Trademark Office